(12) United States Patent
Yamada et al.

(10) Patent No.: US 7,384,375 B2
(45) Date of Patent: Jun. 10, 2008

(54) APPARATUS FOR CONTROLLING AN AUTOMATIC TRANSMISSION

(75) Inventors: Jun Yamada, Nagoya (JP); Tetsuji Kozaki, Aichi-ken (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 225 days.

(21) Appl. No.: 11/013,715

(22) Filed: Dec. 17, 2004

(65) Prior Publication Data

US 2005/0137056 A1 Jun. 23, 2005

(30) Foreign Application Priority Data

Dec. 19, 2003 (JP) .............................. 2003-423792

(51) Int. Cl.
*F16H 61/04* (2006.01)
*F16H 59/64* (2006.01)
*G06F 7/00* (2006.01)

(52) U.S. Cl. ........................... 477/143; 477/98; 701/66

(58) Field of Classification Search ................. 477/98, 477/128, 143, 147, 116, 906; 701/64, 66
See application file for complete search history.

(56) References Cited

U.S. PATENT DOCUMENTS 4,889,015 A * 12/1989 Kondo ....................... 477/155
4,955,256 A * 9/1990 Kashihara et al. .......... 477/152
5,363,724 A * 11/1994 Asahara et al. ............. 477/143
5,439,427 A * 8/1995 Enokido et al. ............ 477/130
5,558,597 A * 9/1996 Oba et al. ..................... 477/98
5,846,162 A * 12/1998 Ito et al. ...................... 477/143
6,102,830 A * 8/2000 Tsutsui et al. .............. 477/143

FOREIGN PATENT DOCUMENTS

| JP | 8-285072 | 11/1996 |
|----|----------|---------|
| JP | 10-281277 | 10/1998 |

* cited by examiner

*Primary Examiner*—Roger Pang
(74) *Attorney, Agent, or Firm*—Nixon & Vanderhye P.C.

(57) ABSTRACT

When a charge control is applied to a clutch during a shifting operation of an automatic transmission, a charge counter of this clutch is set to a predetermined value. When a drain control is applied to the clutch, the charge counter is counted down. In response to renewal of requested gear position during the shifting operation, a judgment is made as to whether the state of charge is clear with respect to hydraulic fluid supplied to the clutch (i.e. to-be-newly-charged clutch) before the charge control is applied to this clutch for establishing a renewed requested gear position. When the charge counter of this clutch is currently counted down, it is decided that the charged condition of hydraulic fluid supplied to the clutch is unclear. Thus, a multi-stage gear shifting control (i.e. replacement or renewal of target gear position) is prohibited, thereby suppressing generation of shift shock.

24 Claims, 15 Drawing Sheets

FIG. 3

| CLUTCH & BRAKE / RANGE | C1 | B1 | C2 | C0 | B0 |
|---|---|---|---|---|---|
| R | ○ | | | | ○ |
| P-N | | | | | |
| 1ST SPEED | | | | ○ | ○ |
| 2ND SPEED | | ○ | | ○ | |
| 3RD SPEED | | | ○ | ○ | |
| 4TH SPEED | | ○ | ○ | | |

○ --- ENGAGED STATE (TORQUE TRANSMITTING CONDITION)

FIG. 9

○ : ENGAGED
× : RELEASED

| CLUTCH BRAKE | C1 | B1 | C2 | C0 | B0 |
|---|---|---|---|---|---|
| COUNTER | CountC1 | CountB1 | CountC2 | CountC0 | CountB0 |
| 1→2 | × | ×→○ | × | ○ | ○→× |
| 1→3 | × | × | ×→○ | ○ | ○→× |
| 1→4 | × | ×→○ | ×→○ | ○→× | ○→× |
| 2→1 | × | ○→× | × | ○ | ×→○ |
| 2→3 | × | ○→× | ×→○ | ○ | × |
| 2→4 | × | ○ | ×→○ | ○→× | × |
| | | | | | ×→○ |

FIG. 10

| SHIFT PATTERN/ TARGET GEAR POSITION  COUNTER | CountB1 | CountC0 |
|---|---|---|
| (a) SHIFT PATTERN FOR SETTING COUNTER (PRESENT GEAR POSITION → TARGET GEAR POSITION) | 1 → 2<br>1 → 4<br>3 → 4<br>3 → 2 | 4 → 3<br>4 → 2<br>4 → 1 |
| (b) TARGET GEAR POSITION FOR COUNTING DOWN COUNTER | 1<br>3 | 4 |
| (c) GEAR POSITION JUDGED AS UNCLEAR STATE OF CHARGE DURING COUNTDOWN OF COUNTER | 2<br>4 | 1<br>2<br>3 |

FIG. 11

| SHIFT PATTERN/ TARGET GEAR POSITION  COUNTER | CountB1 | CountC0 |
|---|---|---|
| (a) SHIFT PATTERN FOR SETTING COUNTER (PRESENT GEAR POSITION → TARGET GEAR POSITION) | 1 → 2<br>1 → 4<br>3 → 4<br>3 → 2 | 4 → 3<br>4 → 2<br>4 → 1 |
| (b) TARGET GEAR POSITION FOR COUNTING DOWN COUNTER | 1<br>3 | 4 |
| (c) GEAR POSITION JUDGED AS UNCLEAR STATE OF CHARGE DURING COUNTDOWN OF COUNTER | 1 → 2<br>1 → 4<br>3 → 4<br>3 → 2 | 4 → 3<br>4 → 2<br>4 → 1 |

APPARATUS FOR CONTROLLING AN AUTOMATIC TRANSMISSION

CROSS-REFERENCE TO RELATED APPLICATION

This application is based upon and claims the benefit of priority from earlier Japanese Patent Application No. 2003-423792 filed on Dec. 19, 2003 so that the description of which is incorporated herein by reference.

BACKGROUND OF THE INVENTION

The present invention relates to a control apparatus for an automatic transmission which is capable of performing a shock-less gear shifting operation when a target gear position is suddenly replaced or renewed with another gear position in response to a new gear shift request (i.e. a requested replacement of target gear position according to driver's preference or driving conditions of a vehicle) which may be raised during a shifting operation of gear position in a speed change mechanism.

According to an automatic transmission for an automotive vehicle, the engine power is transmitted via a torque converter to an input shaft of a speed change mechanism. The speed change mechanism, having the capability of selecting a changing gear ratio, outputs a rotational force from its output shaft and transmits a changed rotational speed to respective driving wheels. A generally known speed change mechanism includes a plurality of gear trains disposed between an input shaft and an output shaft to arrange a plurality of power transmission routes between the input and output shafts which are differentiated in the change gear ratio. The speed change mechanism includes frictional engaging elements, such as clutches and brakes, which are provided for selectively establishing each power transmission route. The fluid pressure applied to respective frictional engaging elements is separately controlled in accordance with a gear shift request. By performing a charge control for charging hydraulic fluid to a predetermined frictional engaging element and a drain control for discharging hydraulic fluid from this frictional engaging element, engagement/disengagement of this frictional engaging element is switched to complete the shifting operation of gear position in the speed change mechanism. In this manner, the power transmission route is selectively established between the input and output shaft of the speed change mechanism so as to switch the change gear ratio.

According to this kind of automatic transmission, a new gear shift request requiring replacement or renewal of target gear position may arise during a currently implementing shifting operation of gear position. In such a case, the speed change mechanism performs a multistage gear shifting operation in response to the new gear shift request. A multi-stage gear shifting control for the speed change mechanism includes interruption of the currently implementing shifting operation to the initial target gear position and reset of target gear position for finally shifting to a replaced or renewed target gear position. The multi-stage gear shifting control forcibly interrupts a charge control for charging hydraulic fluid into a cylinder of a certain clutch or brake, and immediately starts a drain control for discharging the hydraulic fluid from this cylinder in accordance with replacement or renewal of target gear position. Furthermore, if the request to replace or renew the target gear position again arises during the drain control having been just started, it will be necessary to immediately start the charge control again. However, at the moment of such a quick switching of charge/drain control, the state of hydraulic fluid draining from the cylinder may be incomplete. There will be a possibility that excessive hydraulic fluid may rush into the cylinder when the charge control is performed and a significant amount of shift shock (i.e. gear engagement shock) will arise.

To suppress the shift shock occurring during the multistage gear shifting control, Japanese Patent No. 3291970 discloses a technique for completing a shifting operation to a first gear position before starting a shifting operation to a second gear position when a switch request requiring the shifting operation to the second gear position arises during the shifting operation to the first gear position.

However, according to the above-described conventional technique, it will take a long time to complete all of the shifting operations to the first and second gear positions which are sequentially performed.

In this respect, the Japanese Patent No. 3301344 discloses an improved technique, which proposes detecting a fluid pressure supplied to a frictional engaging element actuated to establish a first gear position when switching to a second gear position is requested during a shifting operation for the first gear position. The detected fluid pressure value is usable as a factor indicating the state of currently progressing shifting operation to the first gear position. When the judgment result shows no possibility of causing any substantial shift shock during a multistage gear shifting control, the shifting operation to the second gear position immediately starts in response to the switch request. On the other hand, in a case that the judgment result predicts a significant shift shock, the shifting operation to the second gear position is delayed until the shifting operation to the first gear position is completed.

However, according to the above-described gear shifting control disclosed in the Japanese Patent No. 3301344, when the switch request to the second gear position arises during the shifting operation to the first gear position, only the state of currently progressing shifting operation for the initial gear position (i.e. first gear position) is relied in making a judgment as to whether any shift shock will occur during the multistage gear shifting control. In other words, no consideration is given to the charged/discharged condition of a frictional engaging element to be newly charged to establish the replaced or renewed gear position (i.e. second gear position) in response to the switch request. Thus, it was difficult to accurately predict the shift shock actually occurring during the multistage gear shifting control. More specifically, it depends on the state of hydraulic fluid draining from a frictional engaging element to be newly charged to establish the replaced or renewed gear position (i.e. second gear position) if any shift shock will occur when hydraulic fluid rushes into this frictional engaging element. Thus, a significant shift shock will occur due to excessively supplied hydraulic fluid when the charge control is started for this frictional engaging element. In short, there is no correlation between the state of currently progressing charging operation for one frictional engaging element to establish the initial gear position and the state of hydraulic fluid draining from another frictional engaging element to be newly charged to establish the replaced or renewed gear position. Only relying on the former in accurately predicting the shift shock is not effective at all, because the latter is another key factor possibly causing the shift shock. Thus, according to the above-described conventional gear shifting control, it is impossible to prevent the shift shock from occurring during the multi-stage gear shifting control.

SUMMARY OF THE INVENTION

In view of the above-described conventional problems, the present invention has an object to provide a control apparatus for an automatic transmission which is capable of eliminating shift shock occurring during a multi-stage gear shifting control.

In order to accomplish the above and other related objects, the present invention provides a control apparatus for an automatic transmission including an input shaft receiving a rotational force transmitted from a driving source, a speed change mechanism transmitting the rotation of this input shaft to an output shaft with a changed speed, and a plurality of frictional engaging elements provided for a plurality of gear positions of the speed change mechanism. According to the present invention, the control apparatus sets a target gear position according to a gear shift request and controls fluid pressure applied to respective frictional engaging elements. The control apparatus of the present performs a charge control for charging hydraulic fluid to a predetermined frictional engaging element and/or a drain control for discharging the hydraulic fluid from this predetermined frictional engaging element, thereby selectively engaging and disengaging respective frictional engaging elements so as to complete the shifting operation of gear position in the speed change mechanism. Furthermore, the control apparatus of the present invention includes a multi-stage gear shifting control means, a charged condition judging means, and a multistage gear shift restricting means. The multistage gear shifting control means of the present invention receives a new gear shift request which requires replacement or renewal of the target gear position, and executes a multistage gear shifting control to shift the speed change mechanism to another target gear position in response to the new gear shift request generated during the shifting operation of gear position in the speed change mechanism, The charged condition judging means of the present invention judges whether or not a state of charge is clear with respect to hydraulic fluid supplied to a to-be-newly-charged frictional engaging element to which the charge control is applied in response to replacement or renewal of the target gear position. And, the multi-stage gear shift restricting means of the present invention restricts replacement or renewal of the target gear position when the charged condition judging means decides that the charged condition of hydraulic fluid supplied to the to-be-newly-charged frictional engaging element is unclear.

According to a conventional control apparatus for an automatic transmission, the charged condition of hydraulic fluid supplied to the to-be-newly-charged frictional engaging element may be unclear when replacement or renewal of target gear position is raised (i.e. the multistage gear shifting control is started) in response to a new gear shift request. In such a case, a significant shift shock will occur due to excessive charge of hydraulic fluid if the charge control is performed for a frictional engaging element which is unclear with respect to charged condition of hydraulic fluid supplied to this element In view of such drawbacks, the control apparatus of this invention restricts (for example, prohibits or delays) the replacement or renewal of target gear position when the charged condition of hydraulic fluid supplied to the to-be-newly-charged frictional engaging element is unclear. Thus, the present invention can surely eliminate the shift shock occurring during the multistage gear shifting control.

In general, the charged condition of hydraulic fluid supplied to a frictional engaging element varies depending on various factors, such as history of charge and drain controls having been already done, temperature of hydraulic fluid (i.e. viscosity of hydraulic fluid), flow resistance of hydraulic fluid flowing in a tube, cylinder volume of each frictional engaging element, individual difference of a speed change mechanism, driving conditions etc. Accordingly, quantitatively estimating the charged condition of the frictional engaging element is difficult. In this respect, the present invention only requires a judgment as to whether the charged condition of hydraulic fluid supplied to the to-be-newly-charged frictional engaging element is unclear. In other words, the present invention does not require any quantitative estimation with respect to the charged condition of the to-be-newly-charged frictional engaging element. Thus, bringing the present invention into practice is relatively simple and easy.

According to the present invention, it is preferable that the charged condition judging means decides that the charged condition of hydraulic fluid supplied to the to-be-newly-charged frictional engaging element is unclear until a predetermined period has elapsed since beginning of the drain control for the to-be-newly-charged frictional engaging element. In other words, once a predetermined period has elapsed since beginning of the drain control for the to-be-newly-charged frictional engaging element, it can be decided that the charged condition of hydraulic fluid supplied to the to-be-newly-charged frictional engaging element is clear. In this case, the predetermined period is equivalent to the duration between the beginning of the drain control for the to-be-newly-charged frictional engaging element and completion of discharging of hydraulic fluid. Accordingly, when this predetermined period has elapsed, the amount of hydraulic fluid remaining in the to-be-newly-charged frictional engaging element is substantially equal to a lower limit. It is thus possible to decide that the charged condition of hydraulic fluid supplied to the to-be-newly-charged frictional engaging element is clear.

In general, the viscosity (or flowability) of hydraulic fluid varies depending on the temperature of hydraulic fluid. This gives significant influence to the predetermined period provided between the beginning of the drain control and completion of draining the hydraulic fluid. Considering the above characteristics, it is preferable to determine the predetermined period based on the temperature of the hydraulic fluid stored in the speed change mechanism. With this arrangement, the predetermined period can be adequately changed or adjusted in accordance with the temperature of hydraulic fluid. Accordingly, a reliable control is feasible regardless of the temperature of hydraulic fluid.

Furthermore, it is preferable that the predetermined period is defined as a period of time or an angular region of crank angle. This simplifies the judgment of the predetermined period.

Moreover, it is preferable the charged condition judging means judges the charged condition of hydraulic fluid supplied to the to-be-newly-charged frictional engaging element based on the command history of charge and drain controls performed for the to-be-newly-charged frictional engaging element. The history of charge and drain controls is relatively reliable information and can be used in estimating the charged condition of hydraulic fluid.

For example, the charged condition judging means decides that the charged condition of hydraulic fluid supplied to the to-be-newly-charged frictional engaging element is unclear when the command history for the to-be-newly-charged frictional engaging element is memorized in the order of noncharged state→charge control→drain control and when the drain control is currently performed. This is based on such an assumption that, if the charge control is forcibly interrupted to immediately switch into the drain control, there will be a higher possibility that the state of hydraulic fluid draining from a frictional engaging element become unclear.

Furthermore, it is preferable that the charged condition judging means judges the charged condition of hydraulic fluid supplied to the to-be-newly-charged frictional engaging element based on the history of target gear position. The history of target gear position is relatively reliable information and can be used in estimating the charged condition of hydraulic fluid.

For example, the charged condition judging means decides that the charged condition of hydraulic fluid supplied to the to-be-newly-charged frictional engaging element is unclear when the target gear position is replaced or renewed in the order of first gear position→second gear position→first gear position and when a request of replacement to the second gear position is again received during the shifting operation to the first gear position. This is based on such an assumption that, if the replacement or renewal of target gear position is sequentially done according to such a pattern, there will be a higher possibility that the charged condition of the to-be-newly-charged frictional engaging element becomes unclear.

Regarding the restriction performed by the multistage gear shifting control, it is preferable that the multistage gear shift restricting means prohibits replacement or renewal of the target gear position when the charged condition judging means decides that the charged condition of hydraulic fluid supplied to the to-be-newly-charged frictional engaging element is unclear. With this arrangement, even if a new gear shift request (i.e. requested replacement of target gear position) arises during the shifting operation of gear position, no replacement or renewal of target gear position is allowed when the charged condition of hydraulic fluid supplied to the to-be-newly-charged frictional engaging element is unclear. Accordingly, it becomes possible to surely eliminate the shift shock occurring due to excessive charge of hydraulic fluid.

Furthermore, it is preferable that the multistage gear shift restricting means delays replacement or renewal of the target gear position when the charged condition judging means decides that the charged condition of hydraulic fluid supplied to the to-be-newly-charged frictional engaging element is unclear. According to this arrangement, in a case that the charged condition of hydraulic fluid supplied to the to-be-newly-charged frictional engaging element is unclear, the replacement or renewal of target gear position is delayed until the charged condition become clear even if a new gear shift request (i.e. requested replacement of target gear position) arises during the shifting operation of gear position. Thus, delaying replacement or renewal of target gear position makes it possible to execute the multistage gear shifting control without causing any shift shock.

Furthermore, it is preferable that the multi-stage gear shift restricting means enables the speed change mechanism to shift into an intermediate gear position other than a present target gear position and a temporary target gear position when the charged condition judging means decides that the charged condition of hydraulic fluid supplied to the to-be-newly-charged frictional engaging element is unclear, provided that the state of charge is clear with respect to hydraulic fluid supplied to a frictional engaging element to which the charge control is applied to establish the intermediate gear position.

The "temporary target gear position" is a replaced (or renewed) target gear position being set in response to a new gear shifting request which may arise when the automatic transmission is currently performing the shifting operation. The temporary target gear position is set regardless of the state of charge (clear/unclear) with respect to hydraulic fluid supplied to the frictional engaging element to which the charge control is applied to establish this temporary gear position.

With this arrangement, in a case that there is a possibility of causing any shift shock if the speed change mechanism shifts into the temporary target gear position, it is possible to smoothly shift the speed change mechanism to a gear position near the temporary target gear position without causing any shift shock.

Alternatively, it is preferable that the multistage gear shift restricting means enables the speed change mechanism to shift into a neighboring gear position near a temporary target gear position when the charged condition judging means decides that the charged condition of hydraulic fluid supplied to the to-be-newly-charged frictional engaging element is unclear, provided that the state of charge is clear with respect to hydraulic fluid supplied to a frictional engaging element to which the charge control is applied to establish the intermediate gear position.

BRIEF DESCRIPTION OF THE DRAWINGS

The above and other objects, features and advantages of the present invention will become more apparent from the following detailed description which is to be read in conjunction with the accompanying drawings, in which:

FIG. 3 is a table showing engagement/disengagement of clutches C0, C1, C2 and brakes B0, B1 for realizing respective gear positions of the automatic transmission in accordance with the first embodiment of the present invention;

FIG. 9 is a table showing the setting of charge counters for the first embodiment of the present invention;

FIG. 10 is a modified table showing the setting of charge counters for the first embodiment of the present invention;

FIG. 11 is another modified table showing the setting of charge counters for the first embodiment of the present invention;

DESCRIPTION OF THE PREFERRED EMBODIMENTS

Hereinafter, preferred embodiments of the present invention will be explained hereinafter with reference to attached drawings.

First Embodiment

Figure 1:
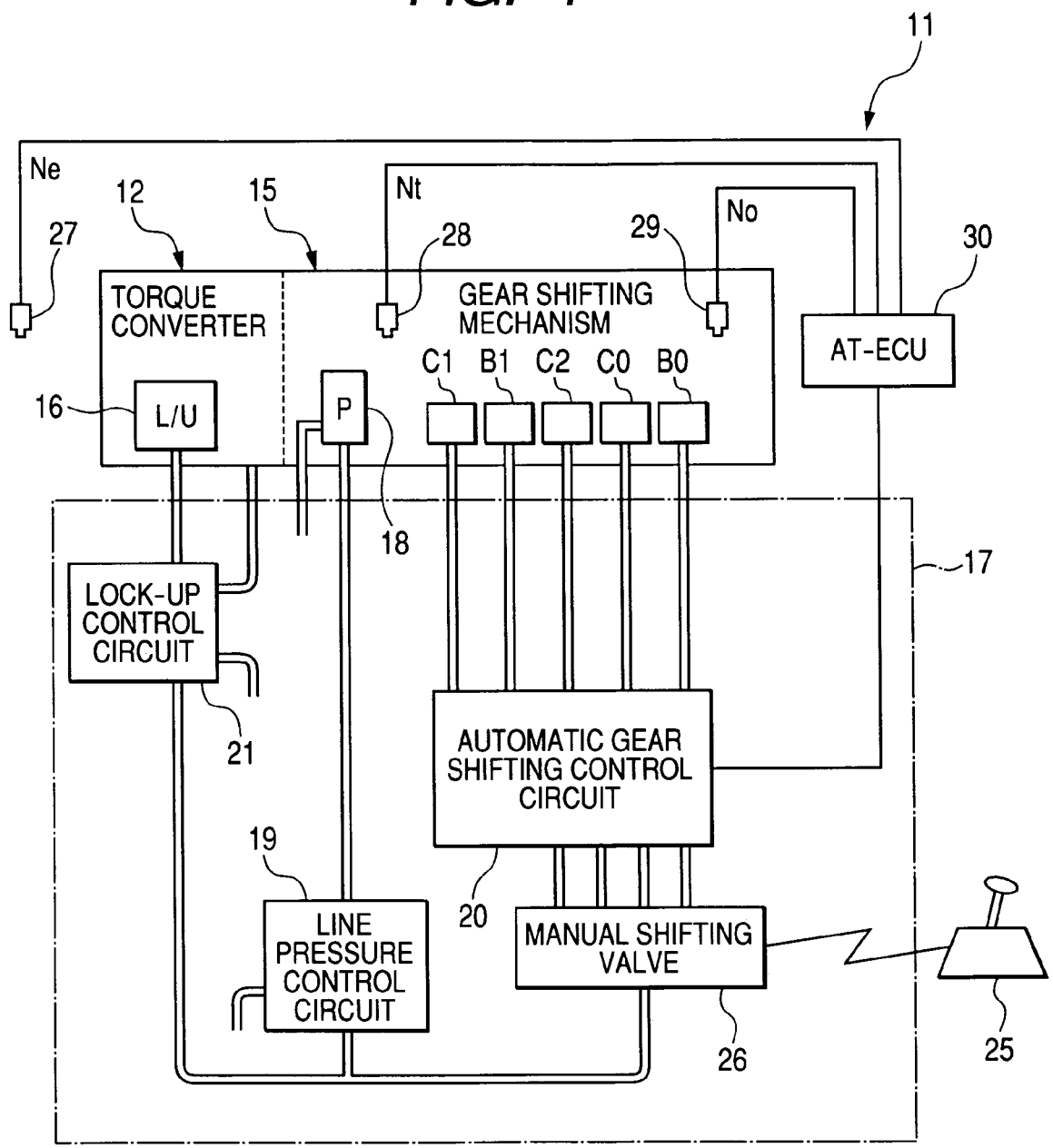
FIG. 1 is a block diagram schematically showing the arrangement of an automatic transmission in accordance with a first embodiment of the present invention.
Figure 2:
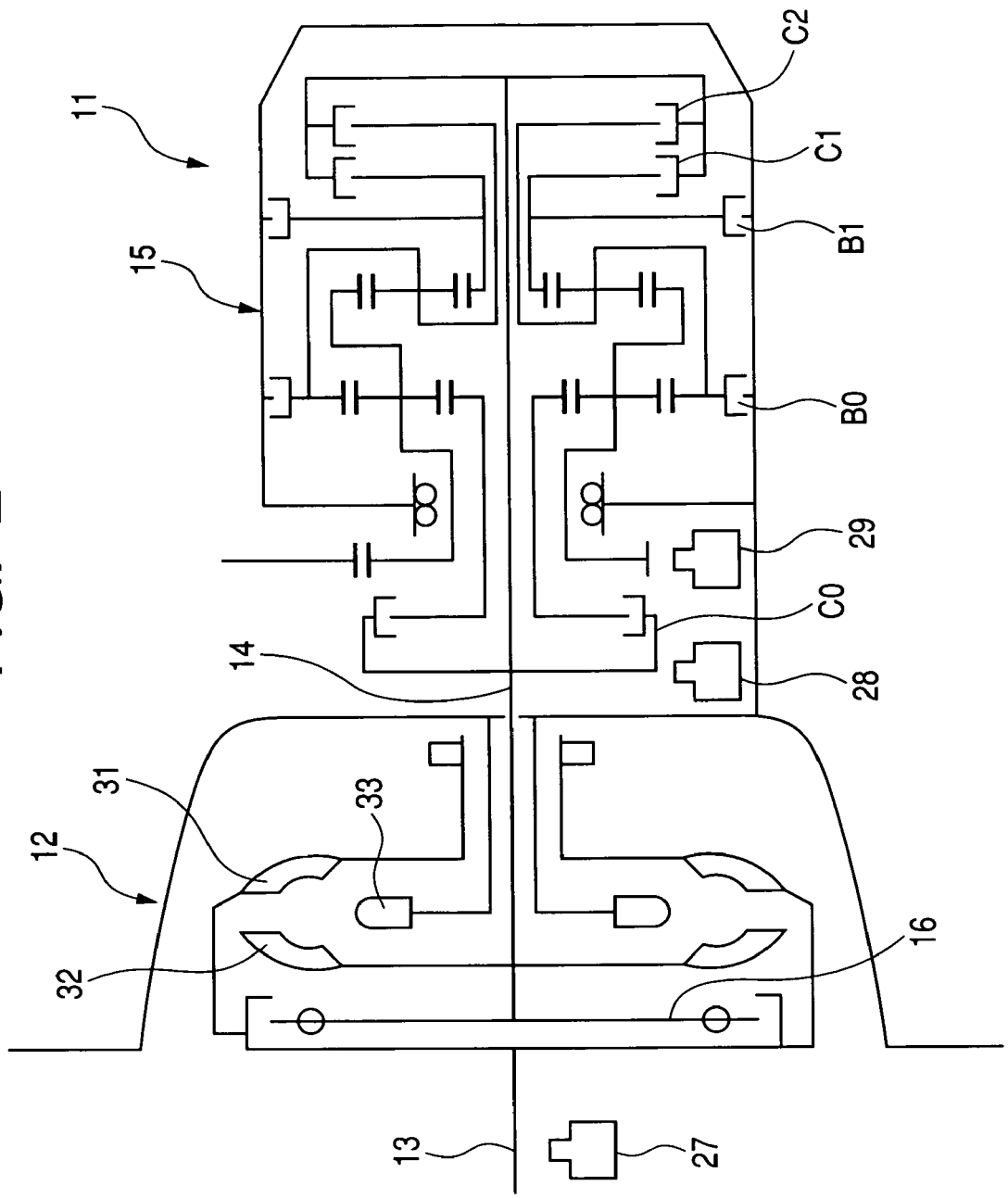
FIG. 2 is a diagram showing the mechanical arrangement of the automatic transmission in accordance with the first embodiment of the present invention.
Figure 4:
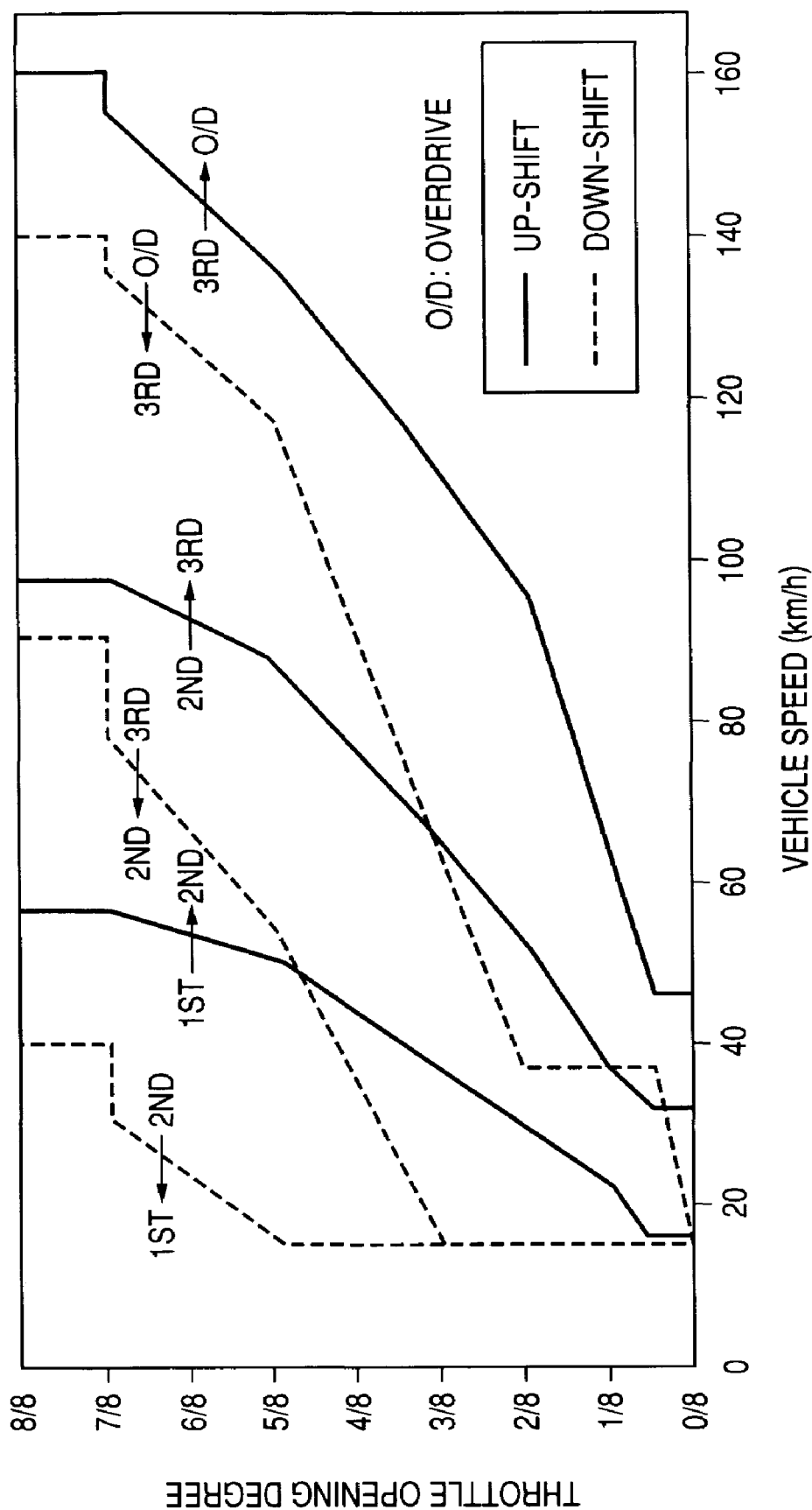
FIG. 4 is a map showing a shift pattern of the automatic transmission in accordance with the first embodiment of the present invention.

A first embodiment of the present invention will be explained with reference to FIGS. 1 to 11. FIGS. 1 and 2 show a schematic arrangement of an automatic transmission 11. As shown in FIG. 2, an engine (not shown) has an output shaft connected to an input shaft 13 of a torque converter 12. An output shaft 14 of the torque converter 12 is connected to a hydraulically driven gear shifting mechanism 15 (i.e. speed change mechanism). The torque converter 12 includes a pump impeller 31 and a turbine runner 32 disposed in an opposed relationship to cooperatively arrange a fluid coupling. A stator 33, disposed between the pump impeller 31 and the turbine runner 32, regulates the flow of fluid (oil). The pump impeller 31 is connected to the input shaft 13 of the torque converter 12. The turbine runner 32 is connected to the output shaft 14 of the torque converter 12.

Furthermore, the torque converter 12 includes a lockup clutch 16 which mechanically engages or releases (disengages) the input shaft 13 and the output shaft 14. An engine output torque is transmitted via the torque converter 12 to the gear shifting mechanism 15. The gear shifting mechanism 15 includes a plurality of gear trains (planetary gears or the like) to change the gear ratio. An output of the gear shifting mechanism 15 is transmitted to driving wheels (front or rear wheels) of the automotive vehicle.

The gear shifting mechanism 15 includes a plurality of clutches C0, C1, and C2 and brakes B0 and B1 which operate as frictional engaging elements for establishing a plurality of gear positions of the automatic transmission 11. As shown in FIG. 3, these clutches C0, C1, C2 and brakes B0, B1 are selectively engaged or released in response to the fluid pressure supplied to them so as to change the combination of gears used for transmitting the engine power to the wheels. In other words, the change gear ratio is switched. FIG. 3 shows a combination of engagement/disengagement of clutches C0, C1, C2 and brakes B0, B1 for a 4-speed automatic transmission, in which mark ○ represents an engaged state (i.e. torque transmitting condition) of each clutch or brake being engaged while no mark represents a released state for establishing respective gear positions. For example, two clutches C0 and C2 are engaged for establishing the 3rd speed. When a shift-down operation from 3rd speed to 2nd speed occurs in the transmission, one of two clutches (i.e. clutch C2) is released and one brake B1 is engaged for establishing 3rd speed. Furthermore, when a shift-up operation from 3rd speed to 4th speed occurs in the transmission, one of two clutched (i.e. clutch C0) is released and one brake B1 is engaged.

As shown in FIG. 1, the gear shifting mechanism 15 includes a hydraulic pump 18 which is driven by the engine. A hydraulic control circuit 17 is provided in an oil pan (not shown) which stores hydraulic fluid (oil). The hydraulic control circuit 17 includes a line pressure control circuit 19, an automatic gear shifting control circuit 20, a lock-up control circuit 21, and a manual shifting valve 26. The hydraulic pump 18 sucks up hydraulic fluid from the oil pan and supplies the hydraulic fluid via the line pressure control circuit 19 into the automatic gear shifting control circuit 20 and also into the lock-up control circuit 21. The line pressure control circuit 19 includes a fluid pressure control valve (not shown) which receives a fluid pressure from the hydraulic pump 18 and controls the line pressure to a predetermined value. The automatic gear shifting control circuit 20 includes a plurality of fluid pressure control valves (not shown) for the use of shift control of gear shifting mechanism 15, which respectively control the fluid pressure supplied to the clutches C0, C1, C2 and brakes B0, B1 in the gear shifting mechanism 15. Furthermore, the lockup control circuit 21 includes a fluid pressure control valve (not shown) for the use of lockup control, which controls the fluid pressure supplied to the lock-up clutch 16.

The manual shifting valve 26 interposes between the line pressure control circuit 19 and the automatic gear shifting control circuit 20. The shift movement of manual shifting valve 26 is linked with the movement of the shift lever 25 which is manipulated by a driver. When the shift lever 25 is in the position of neutral range (N-range) or parking range (P-range), the manual shifting valve 26 assures the fluid pressure supplied into the gear shifting mechanism 15 so that the gear shifting mechanism 15 can establish the neutral state even when no electric power is supplied to the fluid pressure control valves (electromagnetic control valves) of the automatic gear shifting control circuit 20.

On the other hand, the engine is equipped with an engine rotational speed sensor 27 for detecting an engine rotational speed Ne. The gear shifting mechanism 15 is equipped with an input shaft rotational speed sensor 28 and an output shaft rotational speed sensor 29. The input shaft rotational speed sensor 28 detects an input shaft rotational speed Nt of the gear shifting mechanism 15 (i.e. an output shaft rotational speed of torque converter 12). The output shaft rotational speed sensor 29 detects an output shaft rotational speed No of the gear shifting mechanism 15.

An electronic control unit for an automatic transmission (hereinafter, referred to as "AT-ECU" 30 receives output signals produced from the above-described various sensors. AT-ECU 30, mainly arranged by a microcomputer, executes the programs shown in FIGS. 6 to 8. A memory medium (e.g. ROM) incorporated in the microcomputer stores these programs. AT-ECU 30 controls electric power supplied to respective fluid pressure control valves of automatic gear shifting control circuit 20 in accordance with a gear shift request (i.e. requested replacement of target gear position). The gear shift request is generated based on the operated position of shift lever 25 and driving conditions (throttle opening degree, vehicle speed, etc). The control realized by AT-ECU 30 enables the gear shifting mechanism 15 to perform a shifting operation in accordance with a predetermined shift pattern shown in FIG. 4. In short, AT-ECU 30 controls the fluid pressure supplied to respective clutches C0, C1, and C2 and brakes B0 and B1 of the gear shifting mechanism 15 so as to realize engagement/disengagement of clutches C0, C1, C2 and brakes B0, B1 shown in FIG. 3.

As a result, AT-ECU 30 switches the combination of gears to be used to transmit the engine power to the wheels. In other words, AT-ECU 30 changes the gear ratio of the gear shifting mechanism 15. Furthermore, AT-ECU 30 responds to a new gear shift request arising during the shifting operation of gear position in the gear shifting mechanism 15. In this case, AT-ECU 30 replaces (or renews) the target gear position of gear shifting mechanism 15 in accordance with the new gear shift request, and performs a multi-stage gear shifting control for shifting the gear position of gear shifting mechanism 15 to a replaced or renewed target gear position.

For the purpose of simplifying the explanation, the following description simply refers to both the clutches C0, C1, C2 and the brakes B0, B1 of this embodiment as "clutch", knowing the functional differences residing between them. Furthermore, a clutch changing from the released state to the engaged state is referred to as "engaging clutch". A clutch changing from the engaged state to the released state is referred to as "releasing clutch". In a fluid pressure control performed in shifting the gear position of gear shifting mechanism 15, AT-ECU 30 performs a charge control for charging hydraulic fluid to the engaging clutch and a drain control for discharging hydraulic fluid from the releasing clutch.

Hereinafter, the fluid pressure control applied to the clutches of the gear shifting mechanism 15 will be explained with reference to a shifting operation shown in FIG. 5 which is performed to shift the gear position from 2nd speed to 3rd speed.

Figure 5:
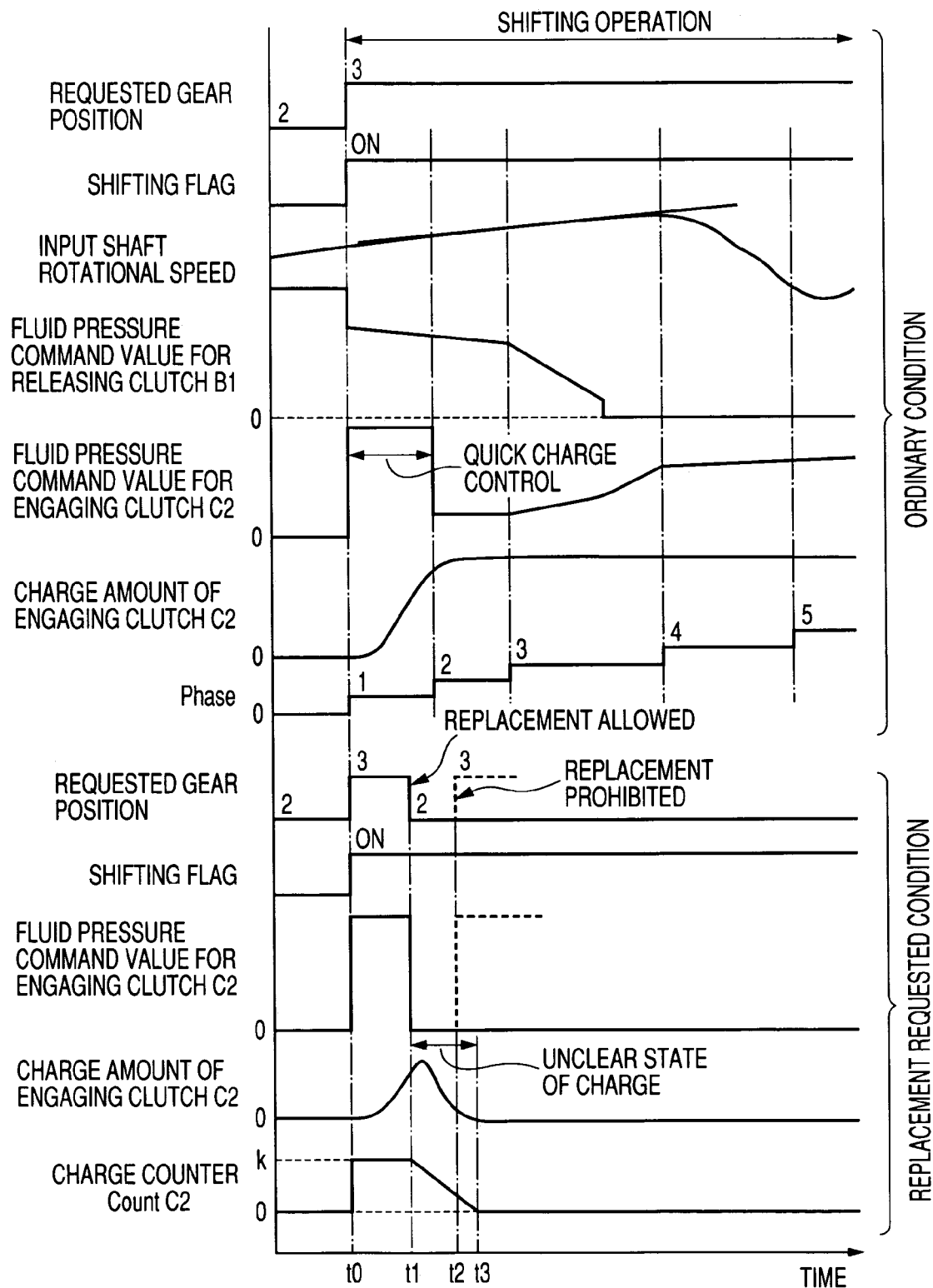
FIG. 5 is a time chart explaining a gear shifting control performed in accordance with the first embodiment of the present invention.

As shown in the upper part of FIG. 5, in accordance with switching of gear position from 2nd speed to 3rd speed, a requested gear position is renewed from 2nd speed to 3rd speed and a shifting flag is set to ON at a timing t0. AT-ECU 30 performs a quick charge control (Phase 1) which generates a fluid pressure command value for the engaging clutch C2 so as to temporarily increase the fluid pressure to a predetermined level higher than a target fluid pressure. This effectively shortens the charge time of hydraulic fluid supplied into the engaging clutch C2. The time of this quick charge control and the fluid pressure command value should be determined beforehand with reference to the temperature of hydraulic fluid or the like, assuming that the charging operation starts from an initial condition in which no hydraulic fluid is charged yet in the engaging clutch C2, so that the fluid pressure acting on the engaging clutch C2 can quickly stabilize at or in the vicinity of a torque phase start timing (i.e. a timing that a torque capacity of the engaging clutch C2 starts appearing).

Subsequently, AT-ECU 30 executes a constant pressure control (Phase 2) which decreases the fluid pressure command value to a predetermined lower fluid pressure level and holds it for a constant time. With this control, the fluid pressure acting on the engaging clutch C2 stabilizes at or in the vicinity of the torque phase start timing thereafter, AT-ECU 30 executes a sweep control (Phase 3) which gradually increases the fluid pressure command value so that the fluid pressure acting on the engaging clutch C2 gradually increases until the torque capacity of engaging clutch C2 reaches a predetermined level required for performing the shifting operation of gear position.

After that, AT-ECU 30 executes a feedback control (Phase 4) which feedback controls the fluid pressure acting on the engaging clutch C2 in such a manner that the change in the input shaft rotational speed during a shifting operation is maintained at a predetermined value. Then, in the final stage of the shifting operation, AT-ECU 30 executes a terminal control (Phase 5) to suppress any gear engagement shock appearing in the shifting operation then complete the shifting operation of gear position.

As shown in the lower part of FIG. 5, the requested gear position is changed from 3rd speed to 2nd speed at timing t1 during the quick charge control performed in the process of shifting the gear position from 2nd speed to 3rd speed. AT-ECU 30 renews the target gear position to 2nd speed and starts the multistage gear shifting control. Hence, the fluid pressure control (i.e. charge control) for the engaging clutch C2 is forcibly interrupted and switched into the drain control (i.e. the fluid pressure command value is switched to 0).

The charge amount of hydraulic fluid to be supplied to the clutch C2 during the drain control varies depending on various factors, such as history of charge and drain controls having been performed, temperature of hydraulic fluid (viscosity of hydraulic fluid), flow resistance of hydraulic fluid flowing in a pipe, cylinder volume of clutch C2, individual difference of the gear shifting mechanism 15, driving conditions etc. Accordingly, quantitatively estimating the charge amount of hydraulic fluid supplied into the clutch C2 is difficult. In other words, the charge amount of hydraulic fluid supplied into the clutch C2 is unclear.

Under such a condition that the charge amount of hydraulic fluid supplied into the clutch C2 is unclear, there will be a possibility that the requested gear position is replaced or renewed again from 2nd speed to 3rd speed as indicated by a dotted line in FIG. 5. At timing t2, AT-ECU 30 renews the target gear position to 3rd speed and forcibly interrupts the drain control performed for the engaging clutch C2, and immediately switches the fluid pressure control for engaging clutch C2 to the quick charge control. In this case, depending on the charged condition of hydraulic fluid in the engaging clutch C2 at this timing t2, there will be a possibility that the hydraulic fluid may excessively rush into the engaging clutch C2 if the quick charge control is performed. Excessively charging hydraulic fluid into the engaging clutch C2 during the multistage gear shifting control possibly causes a large shift shock (i.e. gear engagement shock) due to an excessive engaging force applied by the engaging clutch C2. To solve this problem, it may be possible to change or adjust the quick charge time or the command fluid pressure in response to switching from the drain control into the quick charge control. However, due to unclearness of charge amount of hydraulic fluid, it is difficult to adequately change the quick charge time or the command fluid pressure in accordance with the charge amount at this timing. Furthermore, if such an adjustment of quick charge time or command fluid pressure is inaccurate, it may result in lack of charge and there will be a possibility of abruptly changing the fluid pressure and accordingly causing a large shock immediately after starting the charge of hydraulic fluid.

At the timing t0, the requested gear position is changed from 2nd speed to 3rd speed and accordingly the target gear position is renewed to 3rd speed. AT-ECU 30 sets the initial value of charge counter Count C2 to a predetermined value k, as a set value for the engaging clutch C2 to which the charge control is applied. Subsequently, at timing t1, the requested gear position is changed from 3rd speed to 2nd speed and accordingly the target gear position is renewed to 2nd speed. AT-ECU 30 starts a countdown operation (i.e. the processing for counting down the count value of the charge counter Count C2) at the intervals of a predetermined time or a predetermined crank angle, as the drain control is started for the clutch C2. The lower limit value of charge counter Count C2 is 0.

The charge counter Count C2 is for estimating the period of time during which the charged condition of hydraulic fluid supplied to the clutch C2 is unclear. The predetermined value k is set to a value corresponding to a period of time necessary for the clutch C2 of a fully charged condition to execute discharging of hydraulic fluid under the drain control until the charge amount of hydraulic fluid in the clutch C2 approaches to substantially 0. More specifically, the timing the charge counter Count C2 becomes 0 after starting the drain control is set so as to agree with the timing the charge amount of hydraulic fluid supplied into the clutch C2 becomes substantially 0. Alternatively, the timing the charge counter Count C2 becomes 0 is set to be slightly later than the timing the charge amount of hydraulic fluid supplied into the clutch C2 becomes substantially 0.

In general, the viscosity (flowability) of hydraulic fluid varies depending on the temperature of hydraulic fluid. The period of time from starting the drain control for the clutch C2 to completing the discharging of hydraulic fluid is variable. Accordingly, it is desirable to set the predetermined value k in accordance with the temperature of hydraulic fluid. Furthermore, it is also preferable to correct the predetermined value k with reference to the duration of the charge control carried out immediately before starting the drain control.

Thereafter, as indicated by a dotted line in FIG. 5, the requested gear position is changed from 2nd speed to 3rd speed again. At this timing t2, AT-ECU 30 checks whether or not the charge counter Count C2 is now in the process of countdown (i.e. Count C2>0). As described above, the Count C2 relates to the engaging clutch C2 to which the charge control is next applied. When the charge counter Count C2 is in the process of countdown (i.e. Count C2>0), AT-ECU 30 decides that the charged condition of hydraulic fluid supplied to the engaging clutch C2 is unclear. Thus, if AT-ECU 30 receives any request requiring interruption of the drain control for the engaging clutch C2 being currently implemented for shifting operation of gear position and then requiring immediate start of the charge control for the engaging clutch C2, AT-ECU 30 prohibits the multi-stage gear shifting control from 2nd speed to 3rd speed (i.e. prohibits replacement or renewal of target gear position). Thus, in a case the charged condition of hydraulic fluid supplied to the engaging clutch C2 during the drain control is unclear, this embodiment can surely prevent the hydraulic fluid from being successively charged into the engaging clutch C2 when the charge control is performed. Thus, it becomes possible to suppress any shift shock (i.e. gear engagement shock) occurring due to excessive charge to the engaging clutch C2.

Thereafter, the charge counter Count C2 becomes 0 at timing t3. In other words, the predetermined period (i.e. the duration corresponding to the predetermined value k) has elapsed. Accordingly, at this timing, the hydraulic fluid has been completely discharged or drained from the engaging clutch C2. AT-ECU 30 decides that the charged condition of hydraulic fluid supplied to the engaging clutch C2 is now clear (i.e. a charge amount of hydraulic fluid supplied into the engaging clutch C2 becomes substantially 0). Thereafter, replacement or renewal of target gear position (execution of multi-stage gear shifting control) is allowed.

Figure 6:
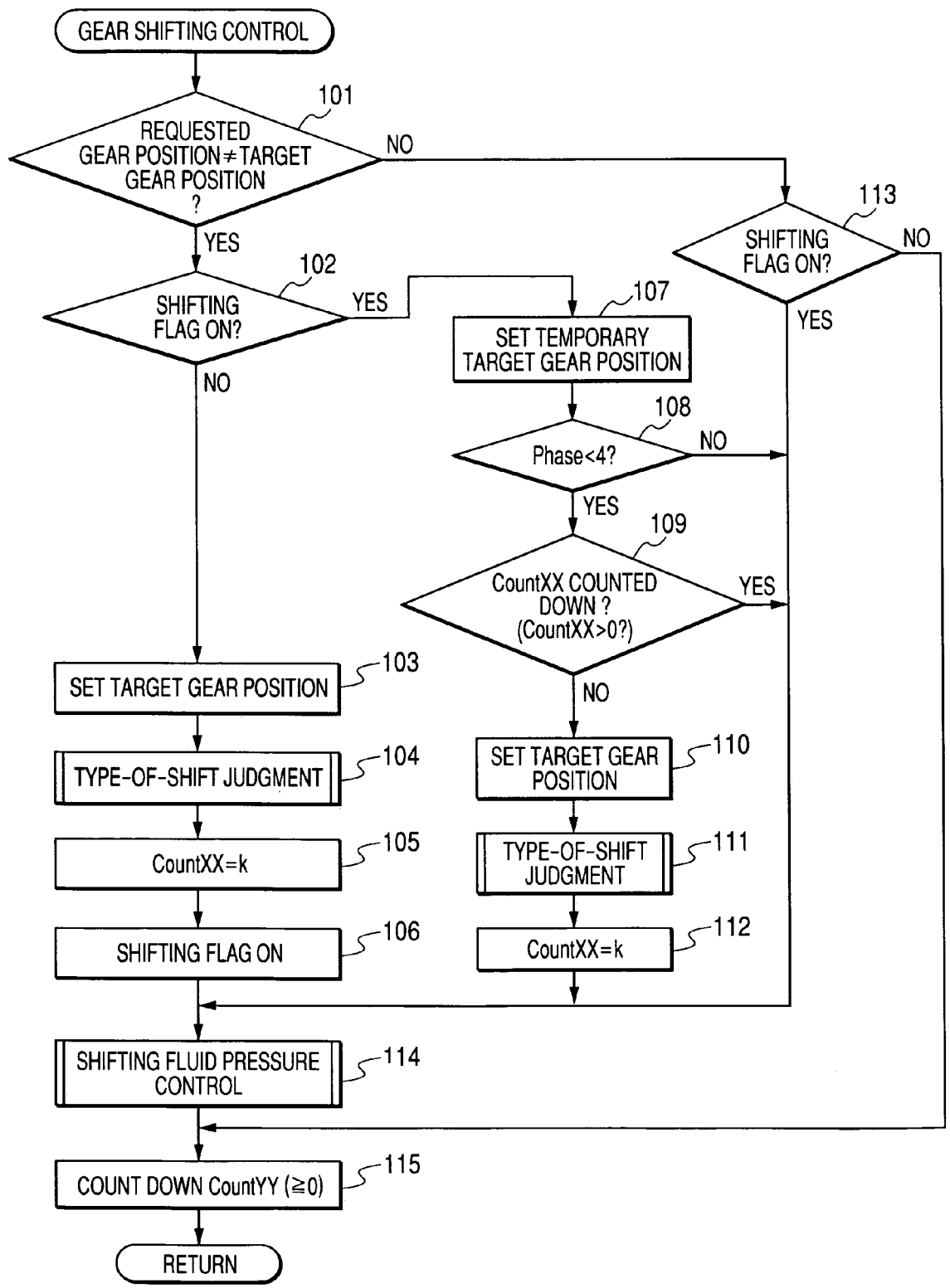
FIG. 6 is a flowchart showing the content of a gear shifting control program for the first embodiment of the present invention.
Figure 7:
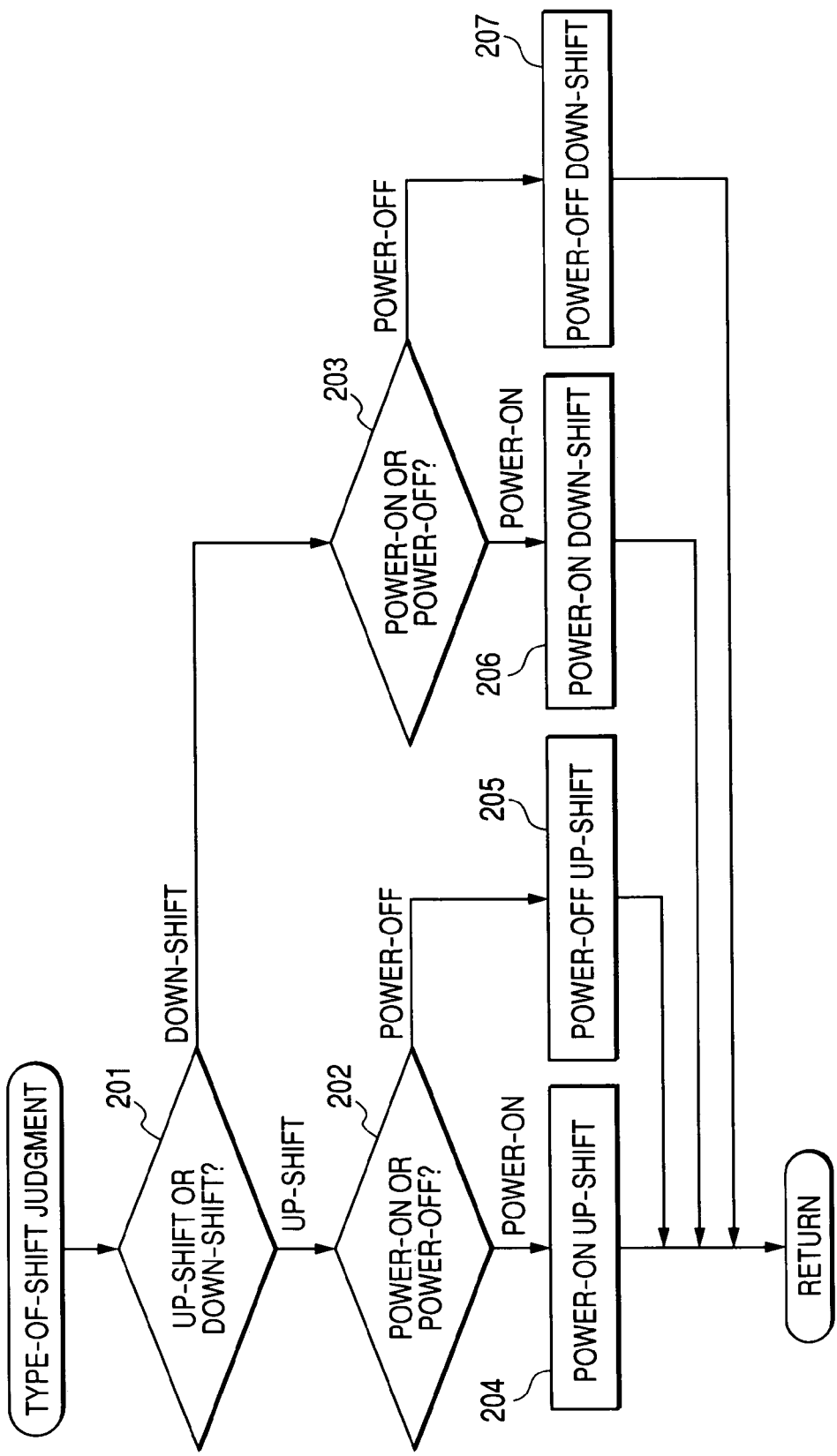
FIG. 7 is a flowchart showing the content of a type-of-shift judgment program for the first embodiment of the present invention.
Figure 8:
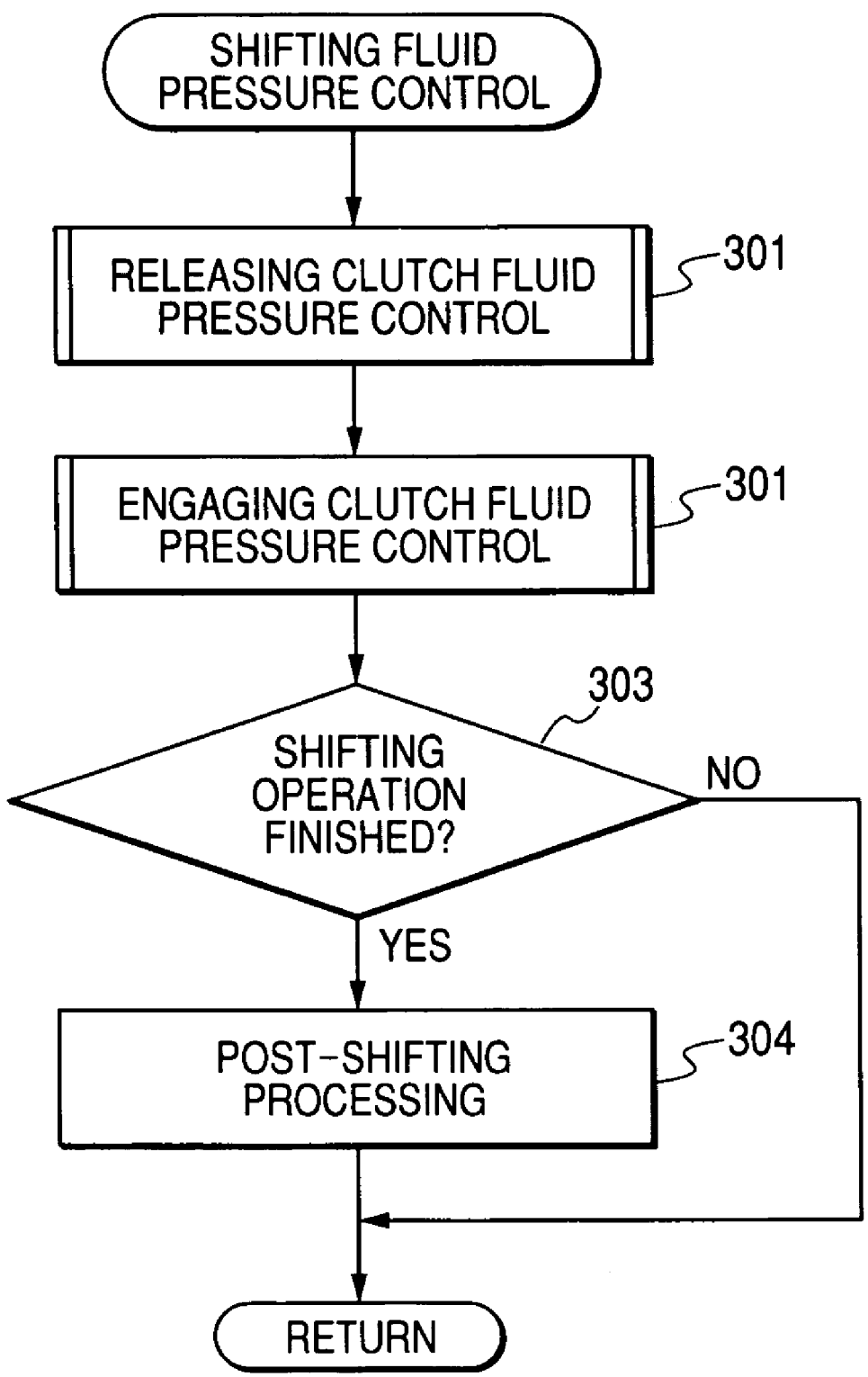
FIG. 8 is a flowchart showing the content of a shifting fluid pressure control program for the first embodiment of the present invention.

To realize the above-described gear shifting control according to the first embodiment, AT-ECU 30 executes the control processing according to the programs shown in FIGS. 6 to 8.

Gear Shifting Control

AT-ECU 30 executes the gear shifting control program shown in FIG. 6 at predetermined intervals (for example, at the period of 8 to 32 sec) in response to starting of operation in AT-ECU 30. After starting this program, AT-ECU 30 executed the processing step 101 to check whether or not the requested gear position has been just renewed (i.e. whether or not this program is executed immediately after renewal of the requested gear position). If the requested gear position is just renewed (i.e. YES in step 101), AT-ECU 30 proceeds to step 102 to further check whether or not the shifting flag is set to ON. The shifting flag being set to ON indicates that the automatic transmission 11 is now performing a shifting operation (i.e. is now shifting the gear position).

When the judgment result of step 101 shows that the requested gear position disagrees with the target gear position (i.e. requested gear position≠target gear position) and also the judgment result of step 102 shows that the automatic transmission 11 is not currently performing the shifting operation (i.e. NO in step 102), AT-ECU 30 decides that a present gear shift request is an ordinary request which is different from the multi-stage gear shifting control. Then, AT-ECU 30 proceeds to step 103 to set a target gear position in accordance with the present requested gear position, considering temperature conditions, fail conditions of the control system, and others. Then, AT-ECU 30 proceeds to step 104 to execute a type-of-shift judgment program which is later described with reference to the flowchart of FIG. 7, thereby judging the type of shifting operation for the target gear position.

Then, AT-ECU 30 proceeds to step 105 to set the initial value of the charge counter CountXX to a predetermined value k. The charge counter CountXX relates to a clutch XX to which the charge control is next applied in a case the shifting operation from the present gear position (i.e. the gear position being set before implementing the gear shifting operation) to the target gear position is performed. During this charge control, the clutch XX is switched from the released state to the engaged state (as indicated by ×→○ in FIG. 9). The predetermined value k is set to a value corresponding to a period of time necessary for the clutch XX of a fully charged condition to execute discharging of hydraulic fluid under the drain control until the charge amount of hydraulic fluid in the clutch XX approaches to substantially 0.

Then, AT-ECU 30 proceeds to step 106 to set the shifting flag to ON and further proceeds to step 114 to execute a shifting fluid pressure control program which is later described with reference to the flowchart of FIG. 8, so that the gear position of gear shifting mechanism 15 can be shifted to a target gear position.

Subsequently, AT-ECU 30 proceeds to step 115 to count down a count value of a charge counter CountYY. The charge counter CountYY relates to a clutch YY to which the drain control is applied in a case the shifting operation from the present gear position (i.e. the gear position being set before implementing the gear shifting operation) to the target gear position is performed. During this drain control, the clutch YY is switched from the engaged state to the released state or maintained in the released state (as indicated by ○→× or indicated by × in FIG. 9). Accordingly, the charge counter CountYY is counted down at processing intervals of this program (i.e. every predetermined period of time). The lower limit value of this charge counter CountYY is 0. It is however possible to count down the charge counter CountYY at a predetermined crank angle.

Furthermore, when the judgment in the step 101 shows that the requested gear position agrees with the target gear position (i.e. requested gear position=target gear position), AT-ECU 30 proceeds to step 113 to check whether or not the shifting flag is set to ON. When the automatic transmission 11 is currently performing the shifting operation (i.e. YES in step 113), AT-ECU 30 proceeds to the step 114 to execute the shifting fluid pressure control and then proceeds to the step 115 to execute the countdown operation for the charge counter CountYY. The above-described explanation is for the processing relating to the ordinary gear shifting control which does not include the multi-stage gear shifting control.

On the other hand, when the judgment result of step 101 shows that the requested gear position disagrees with the target gear position (i.e. requested gear position≠target gear position) and also the judgment result of step 102 shows that the automatic transmission 11 is currently performing the shifting operation (i.e. YES in step 102), AT-ECU 30 decides that a multi-stage gear shifting request (i.e. requested replacement of target gear position) is raised in response to renewal of the requested gear position occurring before completing the implementing shifting operation for a current target gear position. Then, AT-ECU 30 proceeds to step 107 to set a temporary target gear position in accordance with the renewed requested gear position.

Thereafter, AT-ECU 30 proceeds to step 108 to check whether or not the present gear shifting control is in a state of progressing any one of Phase 1 to Phase 3. In other words, AT-ECU 30 checks if an inertia phase has already begun. When the present gear shifting control is in the state of not yet entering into the inertia phase (i.e. YES in step 108), AT-ECU 30 proceeds to step 109 to check whether or not the charge counter Count)X is currently counted down (and CountXX>0). The charge counter CountXX relates to the clutch XX to which the charge control is next applied in a case the target gear position is replaced or renewed by the temporary target gear position being set in the above-described step 107. Hereinafter, the clutch XX is referred to as "to-be-newly-charged clutch XX". In other words, AT-ECU 30 checks if the charged condition of hydraulic fluid supplied to the to-be-newly-charged clutch XX is unclear. The processing executed in this step 109 corresponds to the function realized by the charged condition judging means of the present invention.

When the judgment result of step 109 shows that the charged condition of hydraulic fluid supplied to the to-be-newly-charged clutch XX is clear (i.e. NO in step 109), AT-ECU 30 proceeds to step 110 to recognize the temporary target gear position being set in the above-described step 107 as a finalized target gear position and then AT-ECU 30 proceeds to step 111 to execute the type-of-shift judgment program which is later described with reference to the flowchart of FIG. 7, thereby judging the type of shifting operation for the target gear position.

Subsequently, AT-ECU 30 proceeds to step 112 to set the initial value of the charge counter CountXX to the predetermined value k. The charge counter CountXX relates to the Clutch XX to which the charge control is next applied in a case the target gear position is replaced or renewed before completing the implementing shifting operation for the current target position.

Next, AT-ECU 30 executes the shifting fluid pressure control (in the step 114) for completing the multistage gear shifting control to shift the gear position of gear shifting mechanism 15 to the finalized target gear position. In this case, the processing executed in the step 114 (i.e. shifting fluid pressure control program shown in FIG. 8) corresponds to the function realized by the multistage gear shifting control means of the present invention.

On the other hand, judgment result of the above-described step 109 may indicate that the charge counter CountXX is currently counted down (and CountXX>0). The charge counter CountXX relates to the to-be-newly-charged clutch XX. In this case, it is assumed that the to-be-newly-charged clutch XX is in the drain control for establishing the present target gear position (i.e. a target gear position being initially set) and is not ready for the charge control for establishing a renewed target gear position. In other words, the charged condition of hydraulic fluid supplied to the to-be-newly-charged clutch XX in unclear. In such a condition, if the multi-stage gear shifting control is executed to shift the gear position of gear shifting mechanism 15 to a replaced or renewed target gear position, there will be a possibility that the hydraulic fluid is excessively charged into the to-be-newly-charged clutch XX and accordingly a significant amount of shift shock (gear engagement shock) will occur. Therefore, AT-ECU 30 prohibits the replacement or renewal of target gear position (i.e. prohibits executing the multi-stage gear shifting control). Accordingly, AT-ECU 30 skips the processing of steps 110 to 112 and executes the shifting fluid pressure control (in the step 114) to continuously perform the shifting operation for shifting the gear position of gear shifting mechanism 15 to the present target gear position (i.e. the target gear position being initially set). The processing corresponds to the function realized by the multistage gear shift restricting means of the present invention.

Furthermore, when the judgment result of the above-described step 108 shows that the present gear shifting control is in the state of having already entered into the inertia phase (i.e. NO in step 108), AT-ECU 30 skips the processing of steps 109 to 112 and executes the shifting fluid pressure control (in the step 114) to continuously perform the shifting operation for shifting the gear position of gear shifting mechanism 15 to the present target gear position (i.e. the target gear position being initially set).

Furthermore, when the judgment in the above-described step 101 shows that the requested gear position agrees with the target gear position (i.e. requested gear position=target gear position), AT-ECU 30 proceeds to step 113 to check whether or not the shifting flag is set to ON. When the automatic transmission 11 is currently performing the shifting operation (i.e. YES in step 113), AT-ECU 30 executes the shifting fluid pressure control (in the step 114). On the other hand, when the automatic transmission 11 is not currently performing the shifting operation (i.e. NO in step 113), AT-ECU 30 executes the countdown operation for the charge counter CountYY (in the step 115).

The above-described processing relates to the gear shifting control to be carried out in response to renewal of the requested gear position (i.e. in response to the multi-stage gear shifting request).

Type-of-Shift Judgment

Next, the type-of-shift judgment program executed in the steps 104 and 111 of the gear shifting control program shown in FIG. 6 will be explained hereinafter with reference to the flowchart of FIG. 7. After starting this program, AT-ECU 30 executes the processing of step 201 to check whether the shifting operation to the present target gear position is up-shift or down-shift. Next, AT-ECU 30 executes step 202 or 203 to check whether a load condition applied to the automatic transmission 11 is power-on (i.e. a state in which the automatic transmission 11 is driven by the engine) or power-off (i.e. a state in which the automatic transmission 11 is driven by the driving wheels). According to the above judgment results, AT-ECU 30 identifies the type of shift operation for establishing the present target gear position as a power-n up-shift (in step 204), a power-off up-shift (in step 205), a power-n down-shift (in step 206), or a power-off down-shift (in step 207), before terminating this program.

Shifting Fluid Pressure Control

Next, the shifting fluid pressure control program executed in the step 114 of the gear shifting control program shown in FIG. 6 will be explained with reference to the flowchart of FIG. 8. After starting this program, AT-ECU 30 executes the processing of step 301 to execute a releasing clutch fluid pressure control program (not shown) to control the fluid pressure of a clutch to be released in the process of shifting die gear shifting mechanism 15 to the target gear position. Then, AT-ECU 30 proceeds to step 302 to executes an engaging clutch fluid pressure control program (not shown) to control the fluid pressure of a clutch to be engaged in the process of shifting the gear shifting mechanism 15 to the target gear position.

Subsequently, AT-ECU 30 proceeds to step 303 to check whether or not the shifting operation is finished. If the shifting operation is not finished (i.e. NO in step 303), AT-ECU 30 terminates this program. On the other hand, when the shifting operation is already finished (i.e. YES in step 303), AT-ECU 30 proceeds to step 304 to execute the post-shifting processing which may include an operation for resetting the shifting flag to OFF.

As apparent from the foregoing description, the first embodiment can adequately respond to renewal of requested gear position if it occurs before completing the currently implementing shifting operation. More specifically, the first embodiment makes a judgment based on the count value of the charge counter as to whether the charged condition of hydraulic fluid supplied to the to-be-newly-charged clutch is unclear. The to-be-newly-charged clutch is a clutch to which the charge control is applied for establishing the renewed target gear position. When the judgment result shows that the charged condition of hydraulic fluid supplied to the to-be-newly-charged clutch is unclear, the first embodiment prohibits the replacement or renewal of target gear position (i.e. prohibits executing the multi-stage gear shifting control). Accordingly, the first embodiment surely prevents the clutch from being subjected to the charge control when the charged condition of hydraulic fluid supplied to this clutch is unclear even if the requested gear position is renewed before completing the currently implementing shifting operation. Thus, the first embodiment surely prevents the hydraulic fluid from being excessively charged into the clutch and effectively suppresses the generation of shift shock (i.e. gear engagement shock). Furthermore, considering the difficulty in quantitatively estimating the charged condition of the to-be-newly-charged clutch, the first embodiment simply requires a judgment as to whether the charged condition of hydraulic fluid supplied to the to-be-newly-charged clutch is unclear and the first embodiment does not require quantitatively estimating the charged condition of the to-be-newly-charged clutch. Therefore, bringing the first embodiment into practice is relatively easy.

In this manner, by delaying the replacement or renewal of target gear position, the first embodiment can execute the multistage gear shifting control without causing any shift shock.

Furthermore, the first embodiment can prepare the table of FIG. 10 or 11 which shows various charge counters for the charge and drain controls of respective clutches being set beforehand with reference to the shift pattern or the target gear position. In this case, it is possible to select an optimum charge counter in accordance with the shift pattern or the target gear position, or execute the countdown and judgment operations.

For example, in the case of using the table of FIG. 10, AT-ECU 30 executes the processing of steps 105 and 112 shown in FIG. 6 by referring to the item (a) of FIG. 10. More specifically, AT-ECU 30 selects an optimum charge counter CountXX in accordance with the shift pattern in the shifting operation from the present gear position to the target gear position. AT-ECU 30 sets the initial value of the selected charge counter CountXX as the predetermined value k. Furthermore, AT-ECU 30 executes the processing of step 115 shown in FIG. 6 by referring to the item (b) of FIG. 10. More specifically, AT-ECU 30 selects an optimum charge counter CountYY in accordance with the target gear position and executes the countdown operation for the selected charge counter CountYY. Furthermore, AT-ECU 30 executes the processing of step 109 shown in FIG. 6 by referring to the item (c) of FIG. 10. More specifically, AT-ECU 30 selects an optimum charge counter CountXX in accordance with the temporary target gear position and makes a judgment as to whether the selected counter CountXX is currently counted down (and CountXX>0).

On the other hand, in the case of using the table of FIG. 11, AT-ECU 30 executes the processing of steps 105 and 112 shown in FIG. 6 by referring to the item (a) of FIG. 1. More specifically, AT-ECU 30 selects an optimum charge counter CountXX in accordance with the shift pattern in the shifting operation from the present gear position to the target gear position. AT-ECU 30 sets the initial value of the selected charge counter CountXX as the predetermined value k. Furthermore, AT-ECU 30 executes the processing of step 115 shown in FIG. 6 by referring to the item (b) of FIG. 11. More specifically, AT-ECU 30 selects an optimum charge counter CountYY in accordance with the target gear position and executes the countdown operation for the selected charge counter CountYY. Furthermore, AT-ECU 30 executes the processing of step 109 shown in FIG. 6 by referring to the item (c) of FIG. 11. More specifically, AT-ECU 30 selects an optimum charge counter CountXX in accordance with the temporary target gear position and makes a judgment as to whether the selected counter CountXX is currently counted down (and CountXX>0).

Second Embodiment

Next, a second embodiment of the present invention will be explained with reference to the flowchart of FIG. 12.

Figure 12:
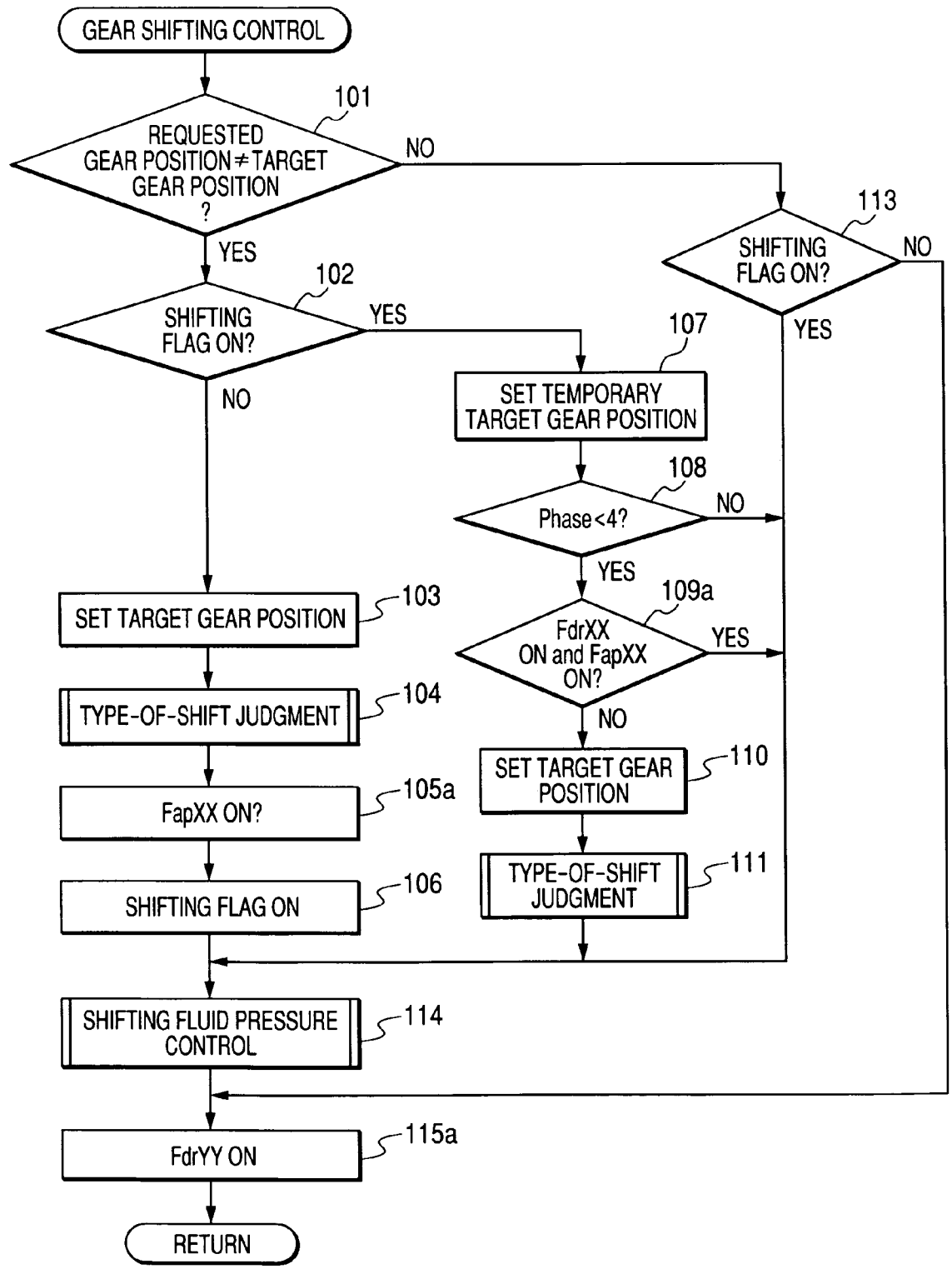
FIG. 12 is a flowchart showing the content of a gear shifting control program for a second embodiment of the present invention.

The second embodiment is characterized in that the flowchart of FIG. 12 uses a charge flag fax and a drain flag fury for memorizing the command history of the charge control and the drain control having been applied to the to-be-newly-charged clutch in executing the gear shifting control program. The second embodiment relies on the command history to judge the charged condition of hydraulic fluid supplied to the to-be-newly-charged clutch.

The gear shifting control program of the second embodiment shown in FIG. 12 is different from the program of the first embodiment shown in FIG. 6 in that the steps 105, 109, and 115 are replaced with steps 105*a*, 109*a*, and 115*a*, respectively. Furthermore, the gear shifting control program of the second embodiment does not include the processing of step 112 shown in FIG. 6.

According to program of the second embodiment, when the judgment result of step 101 shows that the requested gear position disagrees with the target gear position (i.e. requested gear position≠target gear position) and also the judgment result of step 102 shows that the automatic transmission 11 is not currently performing the shifting operation (i.e. NO in step 102), AT-ECU 30 decides that a present gear shift request is an ordinary request which is different from the multi-stage gear shifting control. Then, AT-ECU 30 proceeds to step 103 to set a target gear position in accordance with the present requested gear position. Then, AT-ECU 30 proceeds to step 104 to execute the type-of-shift judgment program to judge the type of shifting operation for the target gear position.

Then, AT-ECU 30 proceeds to step 105*a* to set the charge flag fax to ON. The charge flag fax relates to the clutch XX to which the charge control is next applied in a case the shifting operation from the present gear position (i.e. the gear position being set before implementing the gear shifting operation) to the target gear position is performed. For example, the charge flag fax is reset to OFF in the step 304 of FIG. 8 in response to completion of the shifting operation.

Then, AT-ECU 30 proceeds to step 106 to set the shifting flag to ON and further proceeds to step 114 to execute the shifting fluid pressure control so that the gear position of gear shifting mechanism 15 can be shifted to the target gear position.

Subsequently, AT-ECU 30 proceeds to step 115*a* to set the drain flag fury to ON. The drain flag fury relates to the clutch YY to which the drain control is applied in a case the shifting operation from the present gear position (i.e. the gear position being set before implementing the gear shifting operation) to the target gear position is performed. For example, the drain flag fury is reset to OFF in the step 304 of FIG. 8 in response to completion of the shifting operation.

On the other hand, when the judgment result of step 101 shows that the requested gear position disagrees with the target gear position (i.e. requested gear position≠target gear position) and also the judgment result of step 102 shows that the automatic transmission 11 is currently performing the shifting operation (i.e. YES in step 102), AT-ECU 30 decides that a multi-stage gear shifting request (i.e. requested replacement of target gear position) is raised in response to renewal of the requested gear position occurring before completing the implementing shifting operation for a current target gear position. Then, AT-ECU 30 proceeds to step 107 to set a temporary target gear position in accordance with the renewed requested gear position.

Thereafter, AT-ECU 30 proceeds to step 108 to check whether or not the present gear shifting control is in a state of progressing any one of Phase 1 to Phase 3. In other words, AT-ECU 30 checks if an inertia phase has already begun. When the present gear shifting control is in the state of not yet entering into the inertia phase (i.e. YES in step 108), AT-ECU 30 proceeds to step 109*a* to check whether or not the charge flag FapXX and the drain flag FdrXX are both ON. These flags FapXX and FdrXX relate to the to-be-newly charged clutch XX when the target gear position is replaced or renewed by the temporary step 107 being set in the above-described step 107. When the charge flag FapXX and the drain flag FdrXX are both ON, AT-ECU 30 decides that the fluid pressure control for the to-be-newly charged clutch XX has been carried out in the order of noncharged state→charge control→drain control and the drain control is currently carried out.

When the judgment result of step 109*a* shows that at least one of the charge flag FapXX and the drain flag FdrXX is OFF, namely when at least one of the charge control and the drain control is not currently applied to the to-be-newly-charged clutch XX or already completed, AT-ECU 30 decides that the charged condition of hydraulic fluid supplied to the to-be-newly-charged clutch XX is clear. AT-ECU 30 proceeds to step 110 to recognize the temporary target gear position being set in the above-described step 107 as a finalized target gear position and then AT-ECU 30 proceeds to step 111 to execute the type-of-shift judgment program to judge the type of shifting operation for the target gear position.

Next, AT-ECU 30 executes the shifting fluid pressure control (in the step 114) for completing the multi-stage gear shifting control to shift the gear position of gear shifting mechanism 15 to the finalized target gear position.

On the other hand, the judgment result of the above-described step 109*a* may indicate that the charge flag FapXX and the drain flag FdrXX relating to the to-be-newly-charged clutch XX are both ON. In this case, it is assumed that the fluid pressure control for the to-be-newly-charged clutch XX has been carried out is the order of noncharged state→charge control→drain control and the drain control is currently carried out. Thus, AT-ECU 30 decides that the charged condition of hydraulic fluid supplied to the to-be-newly-charged clutch XX is unclear. AT-ECU 30 prohibits the replacement or renewal of target gear position (i.e. prohibits executing the multi-stage gear shifting control). Accordingly, AT-ECU 30 skips the processing of steps 110 and 111 and executes the shifting fluid pressure control (in the step 114) to continuously perform the shifting operation for shifting the gear position of gear shifting mechanism 15 to the present target gear position (i.e. the target gear position being initially set).

As described above, the second embodiment memorizes the command history of the charge control and the drain control having been performed for the to-be-newly-charged clutch by using the charge flag FapXX and the drain flag FdrYY. The second embodiment makes a judgment based on this command history as to whether the charged condition of hydraulic fluid supplied to the to-be-newly-charged clutch is unclear. When the judgment result shows unclearness of charged condition, the second embodiment prohibits the replacement or renewal of target gear position (i.e. prohibits executing the multistage gear shifting control). Accordingly, the second embodiment surely prevents the clutch from being subjected to the charge control when the charged condition of hydraulic fluid supplied to this clutch is unclear even if the requested gear position is renewed before completing the currently implementing shifting operation. Thus, the second embodiment surely prevents the hydraulic fluid from being excessively charged into the clutch and effectively suppresses the generation of shift shock (i.e. gear engagement shock).

According to the second embodiment, it is preferable to use the history of target gear position in judging the charged condition of hydraulic fluid supplied to the to-be-newly-charged clutch. For example, when the target gear position is replaced or renewed in the order of first gear position→second gear position→first gear position, and when replacement or renewal of target gear position to the second gear position occurs before completing the currently implementing shifting operation to the first gear position, AT-ECU 30 decides that the charged condition of hydraulic fluid supplied to the to-be-newly-charged clutch is unclear. If the target gear position is continuously or sequentially replaced or renewed in such a pattern, there will be a higher possibility that the charged condition of the to-be-newly-charged clutch is unclear.

Third Embodiment

Figure 13:
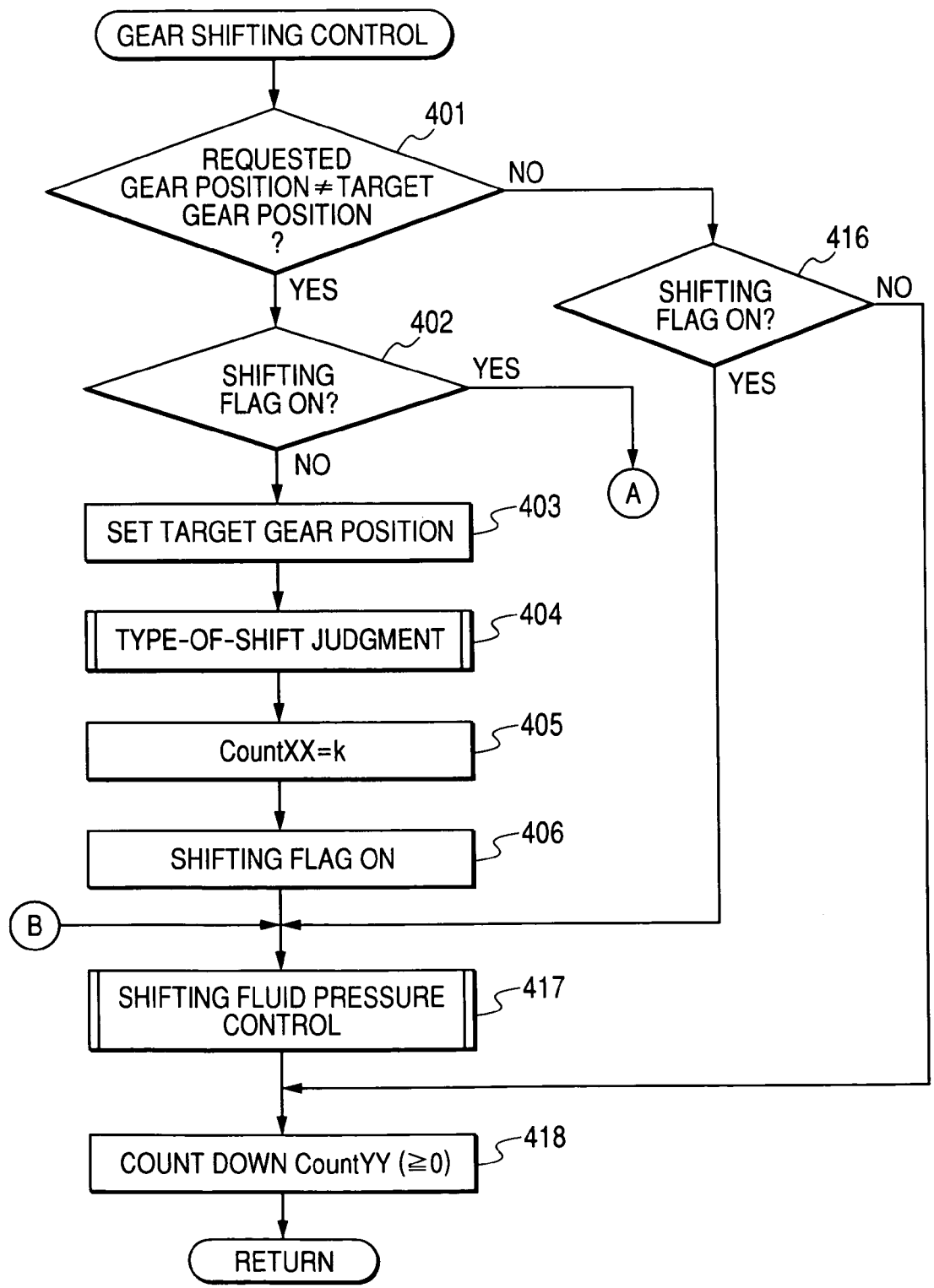
FIG. 13 is a flowchart (part 1) showing the content of a gear shifting control program for a third embodiment of the present invention.
Figure 14:
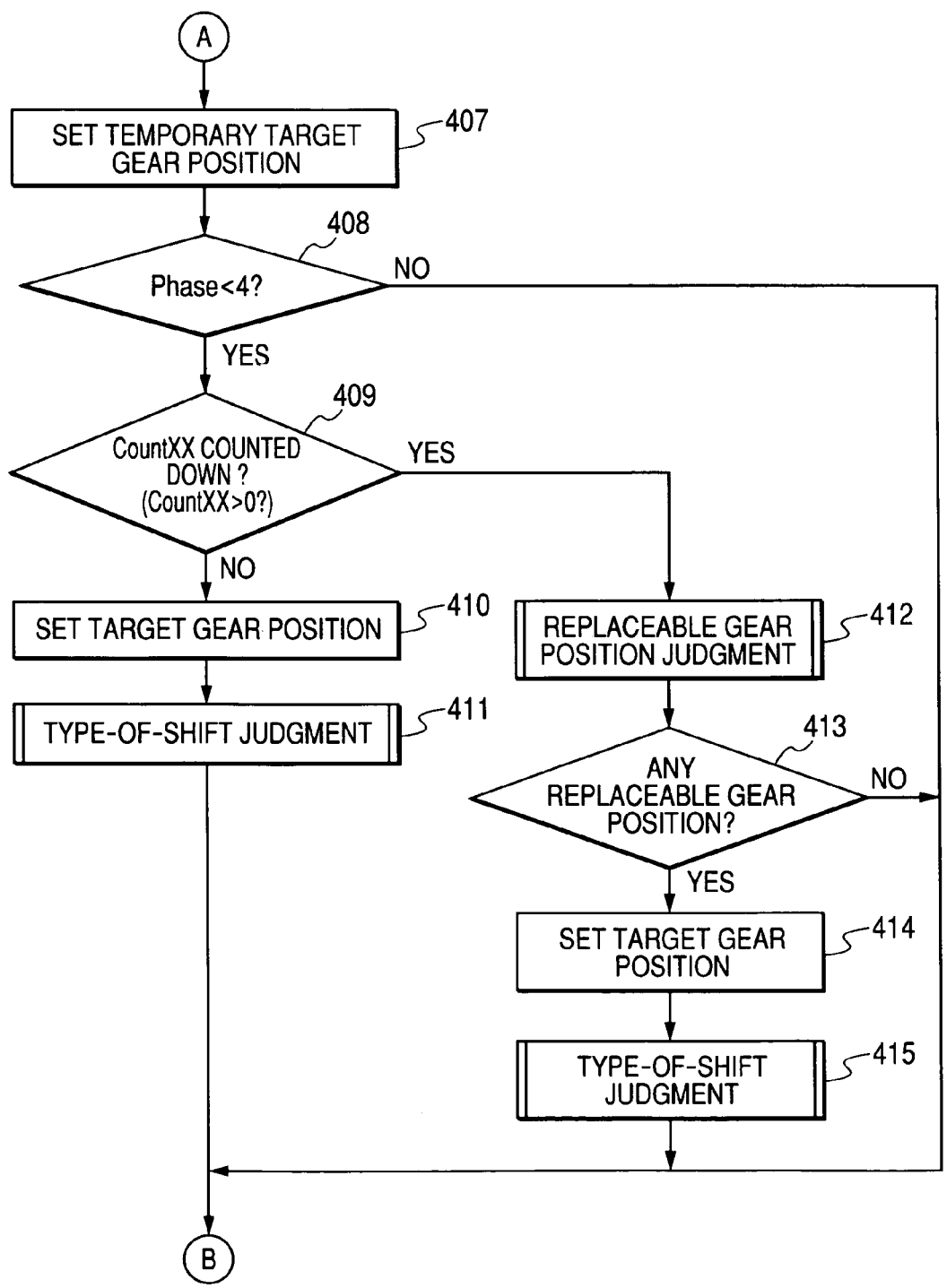
FIG. 14 is a flowchart (part 2) showing the content of the gear shifting control program for the third embodiment of the present invention.
Figure 15:
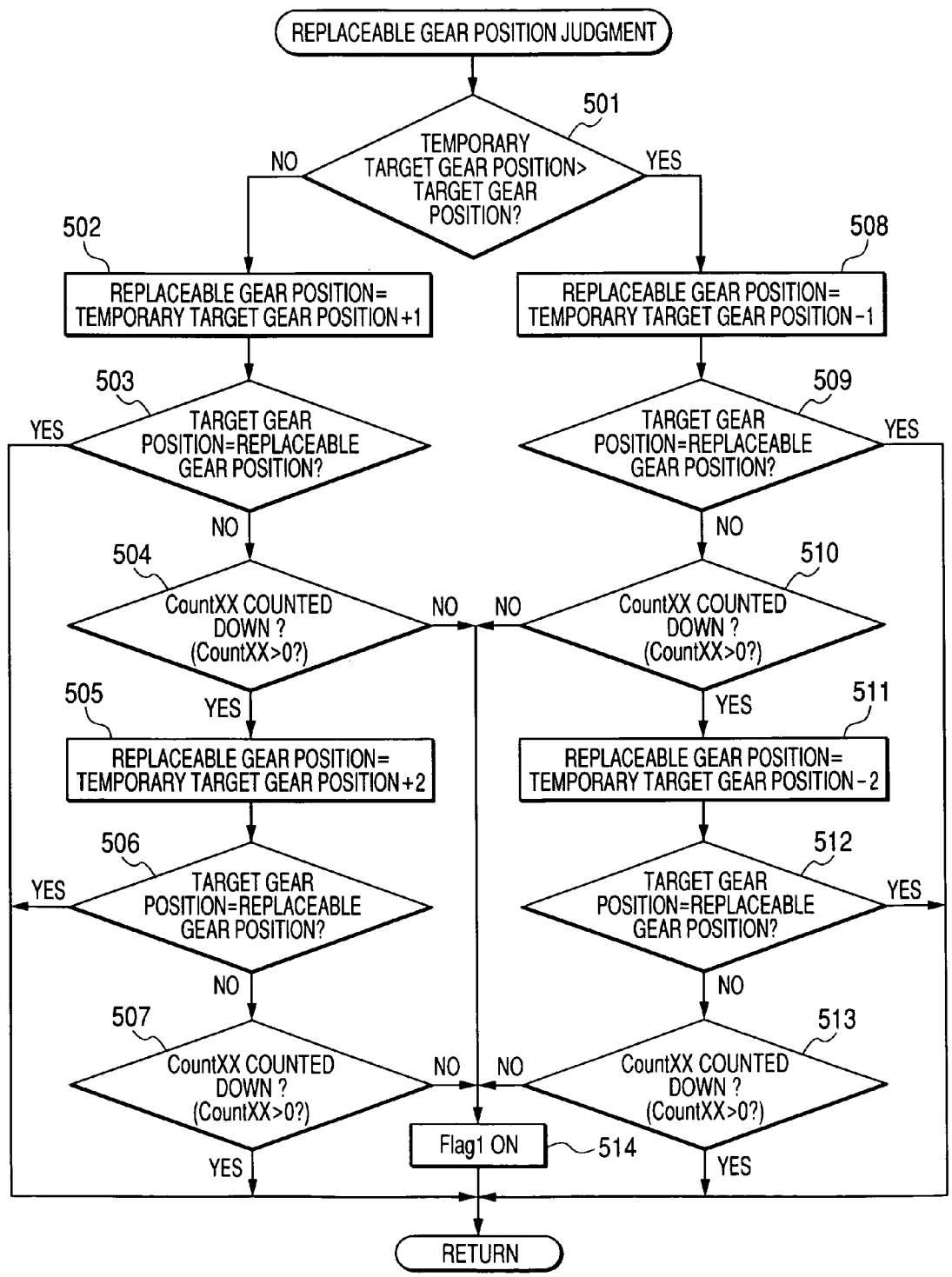
FIG. 15 is a flowchart showing the content of a replaceable gear position judgment program for the third embodiment of the present invention.

Next, a third embodiment of the present invention will be explained with reference to flowcharts shown in FIGS. 13 to 15. The third embodiment is characterized in that, when the charged condition of hydraulic fluid supplied to the to-be-newly-charged clutch is unclear, the target gear position is once shifted to an intermediate gear position between the present target gear position and a temporary target gear position, provided that the state of charge is clear with respect to hydraulic fluid supplied to a clutch to which the charge control is applied to establish the above intermediate gear position.

The "temporary target gear position" is a replaced (or renewed) target gear position being set in response to a new gear shifting request which may arise when the automatic transmission is currently performing the shifting operation. The temporary target gear position is set regardless of the state of charge (clear/unclear) with respect to hydraulic fluid supplied to a clutch to which the charge control is applied to establish this temporary gear position.

For example, it is now assumed that the present target gear position is 1st speed and the renewed target gear position is 4th speed, and the state of charge is unclear with respect to hydraulic fluid supplied to the clutch to be actuated for establishing the 4th speed. In such a case, the target gear position is once changed to 2nd or 3rd speed (provided that the charged condition of hydraulic fluid supplied to the clutch of 2nd or 3rd speed is clear).

Hereinafter, the third embodiment will be explained with reference to the program shown in FIGS. 13 to 15. According to the gear shifting control program shown in FIGS. 13 and 14, when the judgment result of step 401 shows that the requested gear position disagrees with the target gear position (i.e. requested gear position≠target gear position) and also the judgment result of step 402 shows that the automatic transmission 11 is not currently performing the shifting operation (i.e. NO in step 402), AT-ECU 30 decides that a present gear shift request is an ordinary request which is different from the multi-stage gear shifting control. Then, AT-ECU 30 proceeds to step 403 to set a target gear position in accordance with the present requested gear position. Then, AT-ECU 30 proceeds to step 404 to execute the type-of-shift judgment program explained with reference to FIG. 7 to judge the type of shifting operation for the target gear position.

Next, AT-ECU 30 proceeds to step 405 to set the initial value of charge counter CountXX to a predetermined value k. The charge counter CountXX relates to the clutch XX to which the charge control is applied in a case the shifting operation from the present gear position (i.e. the gear position being set before implementing the gear shifting operation) to the target gear position is performed.

Next, AT-ECU 30 proceeds to step 406 to set the shifting flag to ON. Then, AT-ECU 30 proceeds to step 417 to execute the shifting fluid pressure control program explained with reference to FIG. 8 to shift the gear position of gear shifting mechanism 15 to the target gear position.

Then, AT-ECU 30 proceeds to step 418 to count down a count value of the charge counter CountYY. The charge counter CountYY relates to the clutch YY to which the drain control is applied in a case the shifting operation from the present gear position (i.e. the gear position being set before implementing the gear shifting operation) to the target gear position is performed.

On the other hand, when the judgment result of step 401 shows that the requested gear position disagrees with the target gear position (i.e. requested gear position≠target gear position) and also the judgment result of step 402 shows that the automatic transmission 11 is currently performing the shifting operation (i.e. YES in step 402), AT-ECU 30 decides that a multi-stage gear shifting request (i.e. requested replacement of target gear position) is raised in response to renewal of the requested gear position occurring before completing the implementing shifting operation for a current target gear position. Then, AT-ECU 30 proceeds to step 407 of FIG. 14 to set a temporary target gear position in accordance with the renewed requested gear position.

Thereafter, AT-ECU 30 proceeds to step 408 to check whether or not the present gear shifting control is in a state of progressing any one of Phase 1 to Phase 3. In other words, AT-ECU 30 checks if an inertia phase has already begun. When the present gear shifting control is in the state of not yet entering into the inertia phase (i.e. YES in step 408), AT-ECU 30 proceeds to step 409 to check whether or not the charge counter CountXX is currently counted down (and CountXX>0). The charge counter CountXX relates to the clutch XX to which the charge control is next applied in a case the target gear position is replaced or renewed by the temporary target gear position being set in the above-described step 407. Thus, AT-ECU 30 checks whether or not the charged condition of hydraulic fluid supplied to the to-be-newly-charged clutch XX is unclear.

When the charged condition of hydraulic fluid supplied to the to-be-newly-charged clutch XX is clear (i.e. CountXX=0, NO in step 409), AT-ECU 30 proceeds to step 410 to recognize the temporary target gear position being set in the above-described step 407 as a finalized target gear position and then AT-ECU 30 proceeds to step 411 to execute the type-of-shift judgment program which is explained with reference to FIG. 7, thereby judging the type of shifting operation for the target gear position.

Next, AT-ECU 30 executes the shifting fluid pressure control (in step 414) for completing the multi-stage gear shifting control to shift the gear position of gear shifting mechanism 15 to the finalized target gear position.

On the other hand, judgment result of the above-described step 409 may indicate that the charge counter CountXX is currently counted down (and CountXX>0). The charge counter CountXX relates to the to-be-newly-charged clutch XX. In this case, it is assumed that the to-be-newly-charged clutch XX is in the drain control for establishing the present target gear position (i.e. a target gear position being initially set) and is not ready for the charge control for establishing a renewed target gear position. In other words, the charged condition of hydraulic fluid supplied to the to-be-newly-charged clutch XX in unclear. Therefore, AT-ECU 30 proceeds to step 412 to execute a replaceable gear position judgment program which is later described with reference to the flowchart of FIG. 15 to check the presence of any replaceable gear position.

According to the third embodiment, the replaceable gear position is selected from intermediate gear positions between the present target gear position and the temporary target gear position being set in the above-described step 407. Furthermore, according to the third embodiment, the charged condition should be clear with respect to hydraulic fluid supplied to the clutch to which the charge control is applied to establish the selected intermediate gear position.

Thereafter, AT-ECU 30 proceeds to step 413 to check the presence of any replaceable gear position based on the judgment result of above-described step 412. When there is any replaceable gear position (i.e. YES in step 413), AT-ECU 30 proceeds to step 414 to set the replaceable gear position as the target gear position. Then, AT-ECU 30 proceeds to step 415 to execute the type-of-shift judgment program explained with reference to the flowchart of FIG. 7, thereby judging the type of shifting operation for the target gear position.

Next, AT-ECU 30 executes the shifting fluid pressure control (in the step 417) for completing the multi-stage gear shifting control to shift the gear position of gear shifting mechanism 15 to the replaceable target gear position.

On the other hand, when there is no replaceable gear position (i.e. NO in step 413), AT-ECU 30 prohibits the replacement or renewal of target gear position. To this end, AT-ECU 30 skips the processing of steps 414 and 415 and executes the shifting fluid pressure control (in the step 417) to continuously perform the shifting operation for shifting the gear position of gear shifting mechanism 15 to the present target gear position (i.e. the target gear position being initially set).

Next, details of the replaceable gear position judgment program executed in the step 412 of FIG. 14 will be explained with reference to the flowchart of FIG. 15. The replaceable gear position judgment program of this embodiment is, for example, applied to a 4-speed automatic transmission. After starting this program, AT-ECU 30 executes the processing of step 501 to check whether or not the temporary target gear position being set in tie step 407 of FIG. 14 is higher than the present target gear position.

When the judgment result shows that the temporary target gear stage is lower than the present target gear position (i.e. NO in step 501), AT-ECU 30 proceeds to step 502 to set a replaceable gear position which is higher than the temporary target gear position by 1 stage (i.e. replaceable gear position=temporary target gear position+1). Then, AT-ECU 30 proceeds to step 503 to check whether or not the replaceable gear position (i.e. temporary target gear position+1) is identical with the present target gear position.

When the replaceable gear position (i.e. temporary target gear position+1) is identical with the present target gear position. (i.e. YES in step 503), AT-ECU 30 decides that there is no replaceable gear position. In this case, AT-ECU 30 resets a replacement flag Flag1 to OFF or maintains it at OFF to indicate no presence of replaceable gear position. Then, AT-ECU 30 terminates this program.

On the contrary, when the replaceable gear position (i.e. temporary target gear position+1) is not identical with the present target gear position (i.e. NO in step 503), AT-ECU 30 proceeds to step 504 to further check whether or not the charge counter CountXX is currently counted down (and CountXX>0). The charge counter CountXX relates to the clutch XX to which the charge control is next applied in a case the gear position is shifted to the replaceable gear position (i.e. temporary target gear position+1). In other words, AT-ECU 30 makes a judgment with respect to the charged condition of hydraulic fluid to be supplied to the clutch XX to which the charge control is next applied in the case the gear position is shifted to the replaceable gear position (i.e. temporary target gear position+1).

When the judgment result shows that the charge counter CountXX is not currently counted down (i.e. CountXX=0, NO in step 504), the charged condition of hydraulic fluid supplied to the clutch XX is clear. Thus, AT-ECU 30 decides that there is a replaceable gear position. AT-ECU 30 proceeds to step 514 to set the replacement flag Flag1 to ON to indicate the presence of any replaceable gear position. Then, AT-ECU 30 terminates this program.

On the other hand, the judgment result of step 504 shows that the charged condition of hydraulic fluid supplied to the clutch XX is unclear (i.e. CountXX>0, YES in step 504), AT-ECU 30 proceeds to step 505 to set another replaceable gear position which is higher than the temporary target gear position by 2 stages (i.e. replaceable gear position=temporary target gear position+2).

Then, AT-ECU 30 proceeds to step 506 to check whether or not the replaceable gear position (i.e. temporary target gear position+2) is identical with the present target gear position. Furthermore, AT-ECU 30 proceeds to step 507 to further check whether or not the charge counter CountXX is currently counted down (and CountXX>0). When the judgment result of step 506 shows that the replaceable gear position (i.e. temporary target gear position+2) is not identical with the present target gear position (i.e. NO in step 506) and the judgment result of step 507 shows that the charge counter CountXX is not currently counted down (i.e. CountXX=0, NO in step 507), the charged condition of hydraulic fluid supplied to the clutch XX is clear in a case the charge control is next applied to this clutch XX for shifting the gear position to the replaceable gear position (i.e. temporary target gear position+2). AT-ECU 30 thus decides that there is a replaceable gear position AT-ECU 30 proceeds to step 514 to set the replacement flag Flag1 to ON to indicate the presence of any replaceable gear position. Then, AT-ECU 30 terminates this program.

On the other hand, when the judgment result of step 506 shows that the replaceable gear position (i.e. temporary target gear position+2) is identical with the present target gear position (i.e. YES in step 506), or when the judgment result of step 507 shows that the charge counter CountXX is currently counted down (i.e. CountXX>0, YES in step 507), the charged condition of hydraulic fluid supplied to the clutch XX is unclear in a case the charge control is next applied to this clutch XX for shifting the gear position to the replaceable gear position (i.e. temporary target gear position+2). AT-ECU 30 thus decides that there is no replaceable gear position. AT-ECU 30 resets the replacement flag Flag1 to OFF or maintains it at OFF to indicate no presence of replaceable gear position. Then, AT-ECU 30 terminates this program.

Furthermore, when the judgment result of step 501 shows that the temporary target gear stage is higher than the present target gear position (i.e. YES in step 501), AT-ECU 30 proceeds to step 508 to set a replaceable gear position which is lower than the temporary target gear position by 1 stage (i.e. replaceable gear position=temporary target gear position−1). Then, AT-ECU 30 proceeds to step 509 to check whether or not the replaceable gear position (i.e. temporary target gear position−1) is identical with the present target gear position.

When the replaceable gear position (i.e. temporary target gear position−1) is not identical with the present target gear position (i.e. NO in step 509), AT-ECU 30 proceeds to step 510 to further check whether or not the charge counter CountXX is currently counted down (and CountXX>0). When the judgment result of step 510 shows that the charge counter CountXX is not currently counted down (i.e. CountXX=0, NO in step 510), the charged condition of hydraulic fluid supplied to the clutch XX is clear in a case the charge control is next applied to this clutch XX for shifting the gear position to the replaceable gear position (i.e. temporary target gear position−1). AT-ECU 30 thus decides that there is a replaceable gear position. AT-ECU 30 proceeds to step 514 to set the replacement flag Flag1 to ON to indicate the presence of any replaceable gear position. Then, AT-ECU 30 terminates this program.

On the other hand, when the replaceable gear position (i.e. temporary target gear position−1) is identical with the present target gear position (i.e. YES in step 509), AT-ECU 30 decides that there is no replaceable gear position. In this case, AT-ECU 30 resets the replacement flag Flag1 to OFF or maintains it at OFF to indicate no presence of replaceable gear position. Then, AT-ECU 30 terminates this program.

On the other hand, when the judgment result of step 510 shows that the charge counter CountXX is currently counted down (i.e. CountXX>0, YES in step 510), the charged condition of hydraulic fluid supplied to the clutch XX is unclear in a case the charge control is next applied to this clutch XX for shifting the gear position to the replaceable gear position (i.e. temporary target gear position−1). Thus, AT-ECU 30 proceeds to step 511 to set another replaceable gear position which is lower than the temporary target gear position by 2 stages (i.e. replaceable gear position=temporary target gear position−2).

Then, AT-ECU 30 proceeds to step 512 to check whether or not the replaceable gear position (i.e. temporary target gear position−2) is identical with the present target gear position. Furthermore, AT-ECU 30 proceeds to step 513 to further check whether or not the charge counter CountXX is currently counted down (and CountXX>0). When the judgment result of step 512 shows that the replaceable gear position (i.e. temporary target gear position−2) is not identical with the present target gear position (i.e. NO in step 512) and the judgment result of step 513 shows that the charge counter CountXX is not currently counted down (i.e. CountXX=0, NO in step 513), the charged condition of hydraulic fluid supplied to the clutch XX is clear in a case the charge control is next applied to this clutch XX for shifting the gear position to the replaceable gear position (i.e. temporary target gear position−2). AT-ECU 30 thus decides that there is a replaceable gear position AT-ECU 30 proceeds to step 514 to set the replacement flag Flag1 to ON to indicate the presence of any replaceable gear position. Then, AT-ECU 30 terminates this program.

On the other hand, when the judgment result of step 512 shows that the replaceable gear position (i.e. temporary target gear position−2) is identical with the present target gear position (i.e. YES in step 512), or when the judgment result of step 513 shows that the charge counter Count)X is currently counted down (i.e. CountXX>0, YES in step 513), the charged condition of hydraulic fluid supplied to the clutch XX is unclear in a case the charge control is next applied to this clutch XX for shifting the gear position to the replaceable gear position (i.e. temporary target gear position−2). AT-ECU 30 thus decides that there is no replaceable gear position. AT-ECU 30 resets the replacement flag Flag1 to OFF or maintains it at OFF to indicate no presence of replaceable gear position. Then, AT-ECU 30 terminates this program.

As explained above, when the charged condition of hydraulic fluid supplied to the to-be-newly-charged clutch is unclear, the third embodiment temporarily changes the target gear position to an intermediate gear position between the present target gear position and the temporary gear position, provided that the state of charge is clear with respect to the hydraulic fluid supplied to the clutch actuated to establish this intermediate gear position. Therefore, the third embodiment enables the gear shifting mechanism 15 to once shift into an appropriate intermediate gear position near the temporary target gear position, thereby effectively suppressing the shift shock (i.e. gear engagement shock) occurring if the gear shifting mechanism 15 directly shifts into the temporary target gear position.

Fourth Embodiment

Next, a fourth embodiment of the present invention will be explained with reference to the flowchart of FIG. 16. The fourth embodiment executes the gear shifting control program shown in FIG. 16 and is characterized in that, when the charged condition of hydraulic fluid supplied to the to-be-newly-charged clutch is unclear, the target gear position is once shifted to a neighboring gear position near a temporary target gear position provided that the state of charge is clear with respect to hydraulic fluid supplied to a clutch for which the charge control is performed to establish the above intermediate gear position.

The "temporary target gear position" is a replaced (or renewed) target gear position being set in response to a new gear shifting request which may arise when the automatic transmission is currently performing the shifting operation. The temporary target gear position is set regardless of the state of charge (clear/unclear) with respect to hydraulic fluid supplied to a clutch to which the charge control is applied to establish this temporary gear position.

For example, it is now assumed that the present target gear position is 1st speed and the temporary target gear position is 2nd speed, and the state of charge is unclear with respect to hydraulic fluid supplied to the clutch to be actuated for establishing the 2nd speed. In such a case, the target gear position is once changed to 3rd speed (provided that the charged condition of hydraulic fluid supplied to the clutch of 3rd speed is clear).

Figure 16:
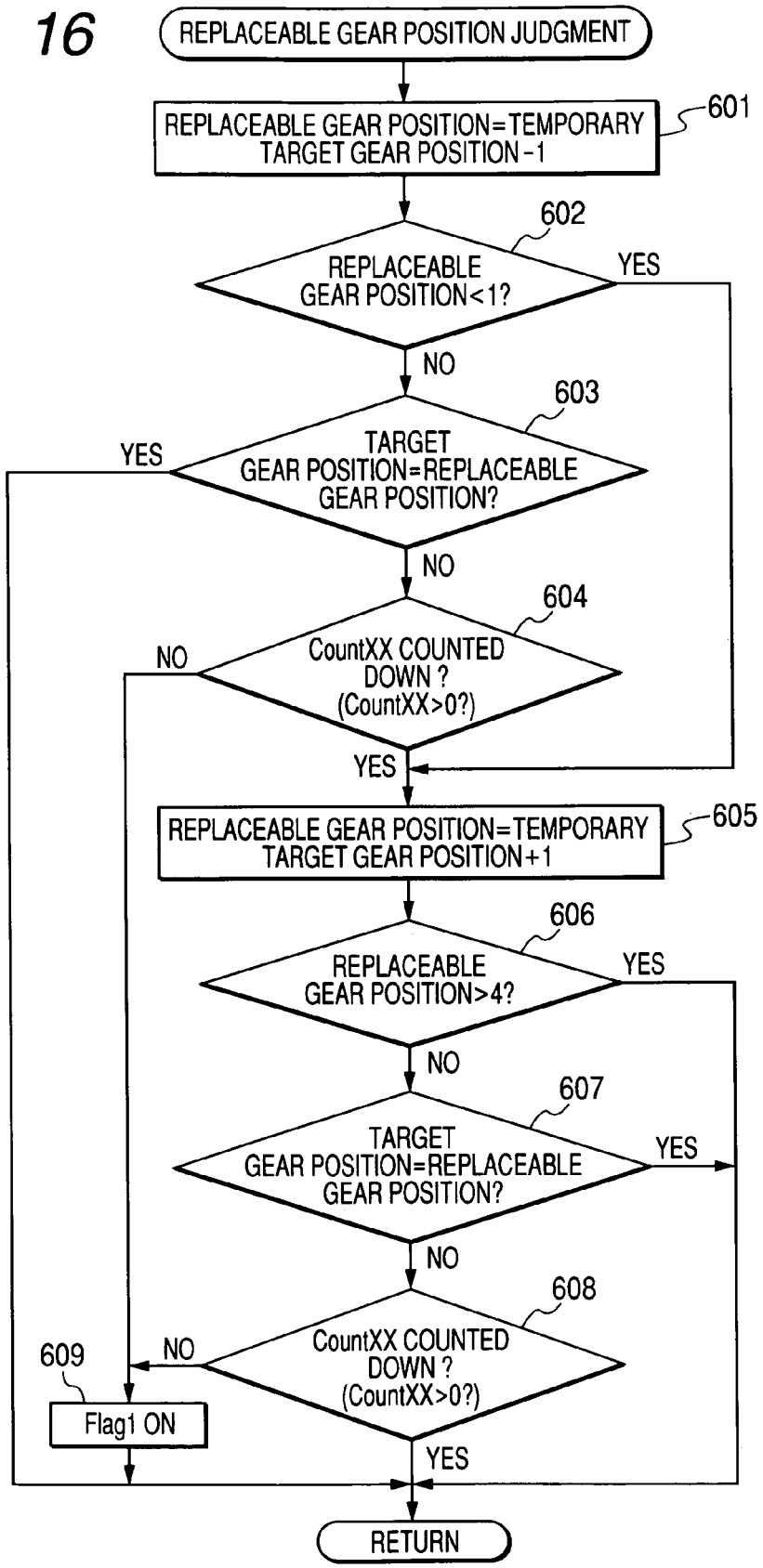
FIG. 16 is a flowchart showing the content of a replaceable gear position judgment program for a fourth embodiment of the present invention.

The gear shifting control program of FIG. 16 is, for example, applied to a 4-speed automatic transmission. After starting this program, AT-ECU 30 executes the processing of step 601 to set a replaceable gear position which is lower than the temporary target gear position by 1 stage (i.e. replaceable gear position=temporary target gear position−1). Then, AT-ECU 30 proceeds to step 602 to check whether or not the replaceable gear position (i.e. temporary target gear position−1) is lower than 1.

When the judgment result shows that the replaceable gear position (i.e. temporary target gear position−1) is equal to or larger than 1 (i.e. NO in step 602), AT-ECU 30 proceeds to step 603 to further check whether or not the replaceable gear position (i.e. temporary target gear position−1) is identical with the present target gear position.

When the judgment result of step 603 shows that the replaceable gear position (i.e. temporary target gear position−1) is identical with the present target gear position (i.e. YES in step 603), there is no replaceable gear position and accordingly AT-ECU 30 resets the replacement flag Flag1 to OFF. And, AT-ECU 30 terminates this program.

On the other hand, when the judgment result of the above-described step 603 shows that the replaceable gear position (i.e. temporary target gear position−1) is not identical with the present target gear position (i.e. NO in step 603), AT-ECU 30 proceeds to step 604 to further check whether or not the charge counter CountXX is currently counted down (and CountXX>0?). The charge counter CountXX relates to the clutch XX to which the charge control is next applied in a case the gear position is shifted to the replaceable gear position (i.e. temporary target gear position−1). In other words, AT-ECU 30 makes a judgment with respect to the charged condition of hydraulic fluid to be supplied to the clutch XX to which the charge control is next applied in the case the gear position is shifted to the replaceable gear position (i.e. temporary target gear position−1).

When the charged condition of hydraulic fluid supplied to the clutch XX is clear (i.e. NO in step 604), there is a replaceable gear position. Thus, AT-ECU 30 proceeds to step 609 to set the replacement flag Flag1 to ON and terminates this program.

On the other hand, when the judgment result of the above-described step 602 shows that the replaceable gear position (i.e. temporary target gear position−1) is lower than 1 (i.e. when the temporary target gear position is 1st speed), AT-ECU 30 proceeds to step 605. Furthermore, when the judgment result of the above-described step 604 shows that the charge counter CountXX is currently counted down (i.e. CountXX>0, YES in step 604), the charged condition of hydraulic fluid supplied to the clutch XX is unclear when the gear position is shifted to the replaceable gear position (i.e. temporary target gear position−1). Thus, AT-ECU 30 proceeds to step 605 to set another replaceable gear position which is higher than the temporary target gear position by 1 stage (i.e. replaceable gear position=temporary target gear position+1). Then, AT-ECU 30 proceeds to step 606 to check whether or not the replaceable gear position (i.e. temporary target gear position+1) is higher than 4.

When the judgment result of step 606 shows that the replaceable gear position (i.e. temporary target gear position+1) is equal to or lower than 4 (i.e. NO in step 606), AT-ECU 30 proceeds to step 607 to further check whether or not the replaceable gear position (i.e. temporary target gear position+1) is identical with the present target gear position. When the judgment result of step 607 shows that the replaceable gear position (i.e. temporary target gear position+1) is not identical with the present target gear position (i.e. NO in step 607), AT-ECU 30 proceeds to step 608 to further check whether or not the charge counter Count XX is currently counted down (and CountXX>0). In other words, AT-ECU 30 makes a judgment with respect to the charged condition of hydraulic fluid to be supplied to the clutch XX to which the charge control is next applied in the case the gear position is shifted to the replaceable gear position (i.e. temporary target gear position+1).

When the judgment result of step 608 shows that charge counter CountXX is not currently counted down (i.e. CountXX=0, NO in step 608), the charged condition of hydraulic fluid supplied to the clutch XX is clear in a case the charge control is applied to this clutch XX to shift the gear position to the replaceable gear position (i.e. temporary target gear position+1). Thus, there is a replaceable gear position. AT-ECU 30 proceeds to step 609 to set the replacement flag Flag1 to ON and terminates this program.

On the other hand, when the judgment result of the above-described step 606 shows that the replaceable gear position (i.e. temporary target gear position+1) is higher than 4 (i.e. when the temporary target gear position is 4th speed), or when the judgment result of the above-described step 607 shows that the replaceable gear position (i.e. temporary target gear position+1) is identical with present target gear position, AT-ECU 30 resets the replacement flag Flag1 to OFF or maintains it at OFF and terminates this program. Furthermore, when the judgment result of the above-described step 608 shows that the charge counter CountXX is currently counted down (i.e. CountXX>0), the charged condition of hydraulic fluid supplied to the clutch XX is unclear in a case the charge control is next applied to this clutch XX for shifting the gear position to the replaceable gear position (i.e. temporary target gear position+1). AT-ECU 30 thus decides that there is no replaceable gear position. AT-ECU 30 resets the replacement flag Flag1 to OFF or maintains it at OFF to indicate no presence of replaceable gear position. Then, AT-ECU 30 terminates this program.

As explained above, when the charged condition of hydraulic fluid supplied to the to-be-newly-charged clutch is unclear, the fourth embodiment temporarily changes the target gear position to a neighboring gear position near the temporary target gear position, provided that the state of charge is clear with respect to the hydraulic fluid supplied to the clutch actuated to establish this neighboring gear position. Therefore, the fourth embodiment enables the gear shifting mechanism 15 to once shift into an appropriate neighboring gear position near the temporary target gear position, thereby effectively suppressing the shift shock (i.e. gear engagement shock) occurring if the gear shifting mechanism 15 directly shifts into the temporary target gear position.

The present invention is not limited to the 4-speed automatic transmission, and is accordingly applicable to a 3-speed, 5-speed, or any other automatic transmission.

What is claimed is:

1. A control apparatus for an automatic transmission comprising an input shaft receiving a rotational force transmitted from a driving source, a speed change mechanism transmitting the rotation of said input shaft to an output shaft with a changed speed, and a plurality of frictional engaging elements provided for a plurality of gear positions of said speed change mechanism, wherein said control apparatus sets a target gear position according to a gear shift request and controls fluid pressure applied to respective frictional engaging elements, and said control apparatus performs a charge control for charging hydraulic fluid to a predetermined frictional engaging element and/or a drain control for discharging hydraulic fluid from said predetermined frictional engaging element, thereby selectively engaging and disengaging respective frictional engaging elements to complete a shifting operation of gear position for said speed change mechanism, wherein said control apparatus comprises:

multi-stage gear shifting control means for receiving a new gear shift request different from a just previous request and which requires a multi-stage gear shifting control to shift said speed change mechanism to a new and different target gear position in response to said new gear shift request;

charged condition judging means for determining a state of hydraulic fluid charge for a to-be-newly-charged frictional engaging element to which the charge control is to be applied in response to said new and different target gear position; and multi-stage gear shift restricting means for restricting said new and different target gear position in response to the state of hydraulic fluid charge determined by said charged condition judging means.

2. The control apparatus for an automatic transmission in accordance with claim 1, wherein:

said charged condition judging means determines that the charged condition of hydraulic fluid supplied to said to-be-newly-charged frictional engaging element is unclear and thus restricts said new and different target gear position until a predetermined period has elapsed since beginning of drain control for said to-be-newly-charged frictional engaging element.

3. The control apparatus for an automatic transmission in accordance with claim 2, wherein said predetermined period is based on a temperature of said hydraulic fluid.

4. The control apparatus for an automatic transmission in accordance with claim 2, wherein said predetermined period is a predetermined period of time.

5. The control apparatus for an automatic transmission in accordance with claim 1, wherein said charged condition judging means determines the charged condition of hydraulic fluid supplied to said to-be-newly-charged frictional engaging element based on command history of charge control and drain control performed for said to-be-newly-charged frictional engaging element.

6. The control apparatus for an automatic transmission in accordance with claim 5, wherein said charged condition judging means determines that the charged condition of hydraulic fluid supplied to said to-be-newly-charged frictional engaging element is unclear when said command history for said to-be-newly-charged frictional engaging element is memorized in the order of noncharged state→, charge control→, and drain control and when the drain control is currently performed.

7. The control apparatus for an automatic transmission in accordance with claim 1, wherein said charged condition judging means determines the charged condition of hydraulic fluid supplied to said to-be-newly-charged frictional engaging element based on history of said target gear position.

8. The control apparatus for an automatic transmission in accordance with claim 7, wherein said charged condition judging means determines that the charged condition of hydraulic fluid supplied to said to-be-newly-charged frictional engaging element is unclear when said target gear position is replaced in the order of first gear position→, second gear position→, first gear position and when a request of replacement to said second gear position is again received during the shifting operation to said first gear position.

9. The control apparatus for an automatic transmission in accordance with claim 1, wherein said multi-stage gear shift restricting means prohibits said new and different target gear position when said charged condition judging means determines that the charged condition of hydraulic fluid supplied to said to-be-newly-charged frictional engaging element is unclear.

10. The control apparatus for an automatic transmission in accordance with claim 1, wherein said multi-stage gear shift restricting means delays said new and different target gear position when said charged condition judging means determines that the charged condition of hydraulic fluid supplied to said to-be-newly-charged frictional engaging element is unclear.

11. The control apparatus for an automatic transmission in accordance with claim 1, wherein said multi-stage gear shift restricting means enables said speed change mechanism to shift into an intermediate gear position other than a present target gear position and a temporary target gear position when said charged condition judging means determines that the charged condition of hydraulic fluid supplied to said to-be-newly-charged frictional engaging element is unclear, provided that the state of charge is clear with respect to a frictional engaging element used to establish said intermediate gear position.

12. The control apparatus for an automatic transmission in accordance with claim 1, wherein said multi-stage gear shift restricting means enables said speed change mechanism to shift into a neighboring gear position near a temporary target gear position when said charged condition judging means determines that the charged condition of hydraulic fluid supplied to said to-be-newly-charged frictional engaging element is unclear, provided that the state of charge is clear with respect to a frictional engaging element used to establish said intermediate gear position.

13. A method for controlling a multi-stage gear shifting mechanism to reduce shift shock when a new gear shifting command is received during an ongoing gear shifting operation, said method comprising:

determining the current hydraulic fluid state of a to-be-newly-charged frictional engaging element to which the charge control would be applied in response to a new and different gear shifting command, and restricting response to the new and different gear shifting command when it is determined that said to-be-newly-charged frictional engaging element has an unclear hydraulic fluid state.

14. A method as in claim 13 wherein:

said determining step judges that the charged condition of hydraulic fluid supplied to said to-be-newly-charged frictional engaging element is unclear until a predetermined period has elapsed since beginning of a drain control for said to-be-newly-charged frictional engaging element.

15. A method as in claim 14 wherein said predetermined period is based on a temperature of said hydraulic fluid.

16. A method as in claim 14 wherein said predetermined period is a predetermined period of time.

17. A method as in claim 13 wherein said determining step judges the charged condition of hydraulic fluid supplied to said to-be-newly-charged frictional engaging element based on a command history of charge control and drain control performed for said to-be-newly charged frictional imaging element.

18. A method as in claim 17 wherein said determining step judges that the charged condition of hydraulic fluid supplied to said to-be-newly-charged frictional engaging element is unclear when said command history for said to-be-newly-charged frictional engaging element is memorized in the order of noncharged state→, charge control→, drain control and when the drain control is currently being performed.

19. A method as in claim 13 wherein said determining step judges the charged condition of hydraulic fluid supplied to said to-be-newly-charged frictional engaging element based on history of target gear position.

20. A method as in claim 19 wherein said determining step judges that the charged condition of hydraulic fluid supplied to said to-be-newly-charged frictional engaging element is unclear when said target gear position is replaced in the order of first gear position→, second gear position→, first gear position and when a new gear shifting command to a prior gear position is received during an earlier commanded shifting operation.

21. A method as in claim 13 wherein said restricting step prohibits replacement or renewal of a target gear position when said determining step judges that the charged condition of hydraulic fluid supplied to said to-be-newly-charged frictional engaging element is unclear.

22. A method as in claim 13 wherein said restricting step delays replacement or renewal of a target gear position when said determining step judges that the charged condition of hydraulic fluid supplied to said to-be-newly-charged frictional engaging element is unclear.

23. A method as in claim 13 wherein said restricting step enables shifting into an intermediate gear position other than a present target gear position and a temporary target gear position when said determining step judges that the charged condition of hydraulic fluid supplied to said to-be-newly-charged frictional engaging element is unclear, provided that the state of charge is clear with respect to hydraulic fluid supplied to a frictional engaging element to which hydraulic fluid is applied to establish said intermediate gear position.

24. A method as in claim 13 wherein said restricting step enables shifting into a neighboring gear position near a temporary target gear position when said determining step judges that the charged condition of hydraulic fluid supplied to said to-be-newly-charged frictional engaging element is unclear, provided that the state of charge with respect to hydraulic fluid supplied to a frictional engaging element to which charge control is applied to establish said intermediate gear position.

* * * * *